(12) United States Patent
Ikebuchi

(10) Patent No.: US 10,837,757 B1
(45) Date of Patent: Nov. 17, 2020

(54) THREE-DIMENSIONAL COORDINATE MEASURING DEVICE

(71) Applicant: Keyence Corporation, Osaka (JP)

(72) Inventor: Masayasu Ikebuchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/795,613

(22) Filed: Feb. 20, 2020

(30) Foreign Application Priority Data

May 17, 2019 (JP) ................................. 2019-093824

(51) Int. Cl.
*G01B 11/14* (2006.01)
*G01B 11/00* (2006.01)
*G01B 11/03* (2006.01)
*G01B 21/04* (2006.01)

(52) U.S. Cl.
CPC ............ *G01B 11/007* (2013.01); *G01B 11/03* (2013.01); *G01B 21/047* (2013.01)

(58) Field of Classification Search
CPC .... G06F 3/04847; G06F 3/0482; G06F 3/041; G06F 3/1423; G06T 7/70; G06T 7/74; G06T 2207/30204; G06T 2207/30244; G06T 2200/24; G01B 11/007; G01B 11/005; H04N 5/23299; H04N 5/2253; G01C 15/00; G01C 15/002; G01C 15/06
USPC ................. 356/601–623, 243.1, 243.4, 243.8
See application file for complete search history.

(56) References Cited

U.S. PATENT DOCUMENTS

| 9,551,566 | B2 | 1/2017 | Wakai | |
|---|---|---|---|---|
| 9,557,159 | B2 * | 1/2017 | Ikebuchi | G01B 5/008 |
| 9,778,023 | B2 | 10/2017 | Osaki et al. | |
| 9,885,564 | B2 | 2/2018 | Osaki et al. | |
| 10,267,620 | B2 | 4/2019 | Ikebuchi | |
| 10,739,126 | B2 * | 8/2020 | Ikebuchi | H04N 5/247 |
| 2002/0175994 | A1 * | 11/2002 | Sakakibara | G06F 3/011 |
| | | | | 348/135 |

(Continued)

FOREIGN PATENT DOCUMENTS

JP     2000266524 A     9/2000

OTHER PUBLICATIONS

Zhang, "A Flexible New Technique for Camera Calibration," IEEE Transactions on Pattern Analysis and Machine Intelligence, 2000, vol. 22, No. 11, pp. 1330-1334.

*Primary Examiner* — Hoa Q Pham

(74) *Attorney, Agent, or Firm* — Kilyk & Bowersox, P.L.L.C.

(57) ABSTRACT

To provide a three-dimensional coordinate measuring device capable of performing highly reliable shape measurement at high accuracy without complicated calibration work. A motorized rotation stage is rotatably supported with respect to a reference base. A reference camera is fixed to the reference base, the reference camera captures an image of a plurality of reference markers provided on the motorized rotation stage. At the time of calibration, a plurality of markers of the reference member are captured at respective different postures of the motorized rotation stage. New camera parameters are calculated based on a plurality of reference images and reference marker information indicating the arrangement of the plurality of markers and then the camera parameters in the main body memory are updated to the new camera parameters.

10 Claims, 17 Drawing Sheets

(56) References Cited

U.S. PATENT DOCUMENTS

| | | | |
|---|---|---|---|
| 2009/0190826 A1* | 7/2009 | Tate | H04N 1/00087 |
| | | | 382/153 |
| 2010/0014750 A1* | 1/2010 | Seko | G06T 7/73 |
| | | | 382/154 |
| 2011/0115922 A1* | 5/2011 | Shimizu | G06T 7/80 |
| | | | 348/188 |
| 2015/0345932 A1* | 12/2015 | Wakai | G01B 21/047 |
| | | | 33/503 |
| 2017/0314911 A1 | 11/2017 | Futami | |
| 2020/0041250 A1 | 2/2020 | Ikebuchi | |
| 2020/0042161 A1* | 2/2020 | Ikebuchi | G01B 11/007 |

\* cited by examiner

THREE-DIMENSIONAL COORDINATE MEASURING DEVICE

CROSS-REFERENCE TO RELATED APPLICATIONS

The present application claims foreign priority based on Japanese Patent Application No. 2019-093824, filed May 17, 2019, the contents of which are incorporated herein by reference.

BACKGROUND OF THE INVENTION

1. Field of the Invention

The present invention relates to a three-dimensional coordinate measuring device capable of measuring the shape and the like of a measurement target.

2. Description of Related Art

Conventionally, a three-dimensional coordinate measuring device is used to measure the shape and the like of a measurement target. In a three-dimensional coordinate measuring device, the positions of a plurality of measurement points on the surface of a measurement target are calculated in sequence. The positions of measurement points to be calculated are represented in a three-dimensional coordinate system. The dimensions of a desired portion of the measurement target are measured based on the calculated positions of the plurality of measurement points.

In the three-dimensional coordinate measuring device (three-dimensional shape measuring device) described in JP-A-2000-266524, the measurement target is placed on a $\theta$ stage. The $\theta$ stage is rotatable about a rotational axis extending vertically. An optical probe is provided above the $\theta$ stage so as to be movable within a vertical plane including the rotational axis.

When the shape of the measurement target is measured, the vertical position of the optical probe is adjusted so that light emitted from the optical probe is incident on the surface of the measurement target. In addition, the optical probe moves horizontally within the vertical plane and the $\theta$ stage rotates. This causes the optical probe to scan the entire upper surface of the measurement target.

The position of the optical probe when light emitted from the optical probe is incident on each of a plurality of measurement points on the measurement target is detected by a plurality of detection sections such as a plurality of laser length measuring devices and rotary encoders. The positions (three-dimensional coordinates) of the measurement points are calculated based on a plurality of detection results.

As described above, in an optical coordinate measuring device, the positions of the plurality of measurement points on the measurement target are calculated by the plurality of detection sections. Accordingly, reduction in the detection accuracy of the detection sections disables the measurement of the shape of the measurement target at high accuracy. The detection accuracy by the detection sections is reduced by, for example, a deformation of various components of the detection sections, a deviation caused in the positional relationship between the plurality of components, and the like. Accordingly, in the optical coordinate measuring device, the detection sections need to be calibrated at appropriate timings so as to keep high measurement accuracy.

Generally, the user of detection sections such as laser length measuring devices and rotary encoders prepares predetermined calibration tools according to the detection section and performs calibration using the tools. Accordingly, to calibrate the plurality of detection sections in the three-dimensional coordinate measuring device described above, the user needs to prepare a calibration tool for each of the detection sections and perform calibration. Such calibration work is troublesome for the user.

SUMMARY OF THE INVENTION

An object of the invention is to provide a three-dimensional coordinate measuring device capable of performing highly reliable shape measurement at high accuracy without complicated calibration work.

(1) A three-dimensional coordinate measuring device according to the invention includes a measurement point information acquisition unit that acquires, as measurement point information, information about a position of a measurement point on a measurement target when a shape of a measurement target is measured; a motorized rotation member on which the measurement point information acquisition unit is mountable or the measurement target is placeable, the motorized rotation member being rotatable about a first rotational axis; a plurality of reference markers provided on the motorized rotation member; a reference imaging unit fixed to a reference base, the reference imaging unit capturing the plurality of reference markers; a storage unit that stores information about arrangement of the plurality of reference markers as reference marker information and stores an imaging parameter of the reference imaging unit; a coordinate calculation unit that calculates position/posture information indicating a position and a posture of the motorized rotation member with respect to the reference imaging unit based on reference image data indicating an image of the plurality of reference markers captured by the reference imaging unit and the reference marker information and the imaging parameter stored in the storage unit when the shape of the measurement target is measured and calculates coordinates of the measurement point based on the calculated position/posture information and the measurement point information acquired by the measurement point information acquisition unit; and a calibration updating unit that calculates a new imaging parameter based on the reference marker information stored in the storage unit and a plurality of pieces of reference image data acquired by causing the reference imaging unit to capture the plurality of reference markers in a plurality of states in which a position and a posture of the motorized rotation member are different while causing the motorized rotation member to shift to the plurality of states by rotating the motorized rotation member about the first rotational axis and updates the imaging parameter stored in the storage unit before the calibration to the calculated new imaging parameter when calibration of the reference imaging unit is performed.

In the three-dimensional coordinate measuring device, the measurement point information acquisition unit is attached to the motorized rotation member or the measurement target is placed on the motorized rotation member. When the motorized rotation member rotates in the state in which the measurement point information acquisition unit is attached to the motorized rotation member, the position and the posture of the measurement point information acquisition unit with respect to the reference base are changed with this rotation. Alternatively, when the motorized rotation member rotates in the state in which the measurement target is placed on the motorized rotation member, the position and the posture of the measurement target with respect to the reference base are changed with this rotation.

When the shape of the measurement target is measured, the measurement point information acquisition unit acquires information about the position of the measurement point on the measurement target as measurement point information. In addition, the reference imaging unit captures a plurality of reference markers provided on the motorized rotation member and generates reference image data. After that, position/posture information is calculated based on the reference image data, the reference marker information, and the imaging parameter and then the coordinates of the measurement point are calculated based on the calculated position/posture information and the measurement point information.

When calibration of the reference imaging unit is performed, the motorized rotation member shifts to the plurality of states in which the position and posture thereof are different. In each of the plurality of states, the reference imaging unit captures the plurality of reference markers. A new imaging parameter is calculated based on a plurality of pieces of reference image data and reference marker information thus acquired and the imaging parameter stored in the storage unit is updated to the new imaging parameter. In this case, even when a plurality of components included in the reference imaging unit deforms or the positional relationship between the plurality of components deviates, the imaging parameter stored in the storage unit is updated to an appropriate imaging parameter without complicated calibration work by the user.

As a result, highly reliable shape measurement can be performed at high accuracy without complicated calibration work.

(2) The three-dimensional coordinate measuring device may further include a calibration deciding unit that calculates positions of projected images of the plurality of reference markers on a light receiving surface of the reference imaging unit based on the reference marker information and the imaging parameter stored in the storage unit, detects an actual positions of the projected images of the plurality of reference markers on the light receiving surface based on the plurality of pieces of reference image data acquired by causing the reference imaging unit to capture the plurality of reference markers, makes a decision of necessity of the calibration of the reference imaging unit depending on whether a relationship between the calculated positions of the projected images and the detected actual positions of the projected images meet a predetermined permissible condition, and outputs a result of the decision.

In this case, the user can grasp the necessity of calibration of the reference imaging unit based on the result of the decision output from the calibration deciding unit.

(3) The three-dimensional coordinate measuring device may further include a presentation unit that presents, to a user, the result of the decision output from the calibration deciding unit.

In this case, the result of the decision is presented in presentation unit. This enables the user to easily grasp the necessity of the calibration of the reference imaging unit.

(4) The three-dimensional coordinate measuring device may further include a probe that has a plurality of measurement markers and designates the measurement point on the measurement target, in which the measurement point information acquisition unit may be attached to the motorized rotation member and configured to be able to capture the plurality of measurement markers of the probe, and the measurement point information may include measurement image data indicating an image of the plurality of measurement markers captured by the measurement point information acquisition unit.

In this case, when the shape of the measurement target is measured, the plurality of measurement markers of the probe is captured by the measurement point information acquisition unit and measurement image data is generated. This enables the coordinates of the measurement point indicated by the probe with respect to the measurement point information acquisition unit to be calculated based on the image of the plurality of measurement markers indicated by the measurement image data.

(5) The first rotational axis may extend vertically or horizontally.

In this case, the measurement target or the measurement point information acquisition unit placed on the motorized rotation member rotates together with the motorized rotation member about the rotational axis extending vertically or horizontally.

(6) The motorized rotation member may be also rotatable about a second rotational axis, the first rotational axis may extend vertically, and the second rotational axis may extend horizontally.

In this case, the measurement target or the measurement point information acquisition unit placed on the motorized rotation member rotates together with the motorized rotation member about the rotational axis extending vertically or horizontally.

(7) The motorized rotation member may be movable within a predetermined plane.

In this case, the measurement point information acquisition unit attached to the motorized rotation member or the measurement target placed on the motorized rotation member moves together with the motorized rotation member within a predetermined plane.

According to the invention, highly reliable shape measurement can be performed at high accuracy without complicated calibration work.

DESCRIPTION OF EMBODIMENTS

Figure 1:
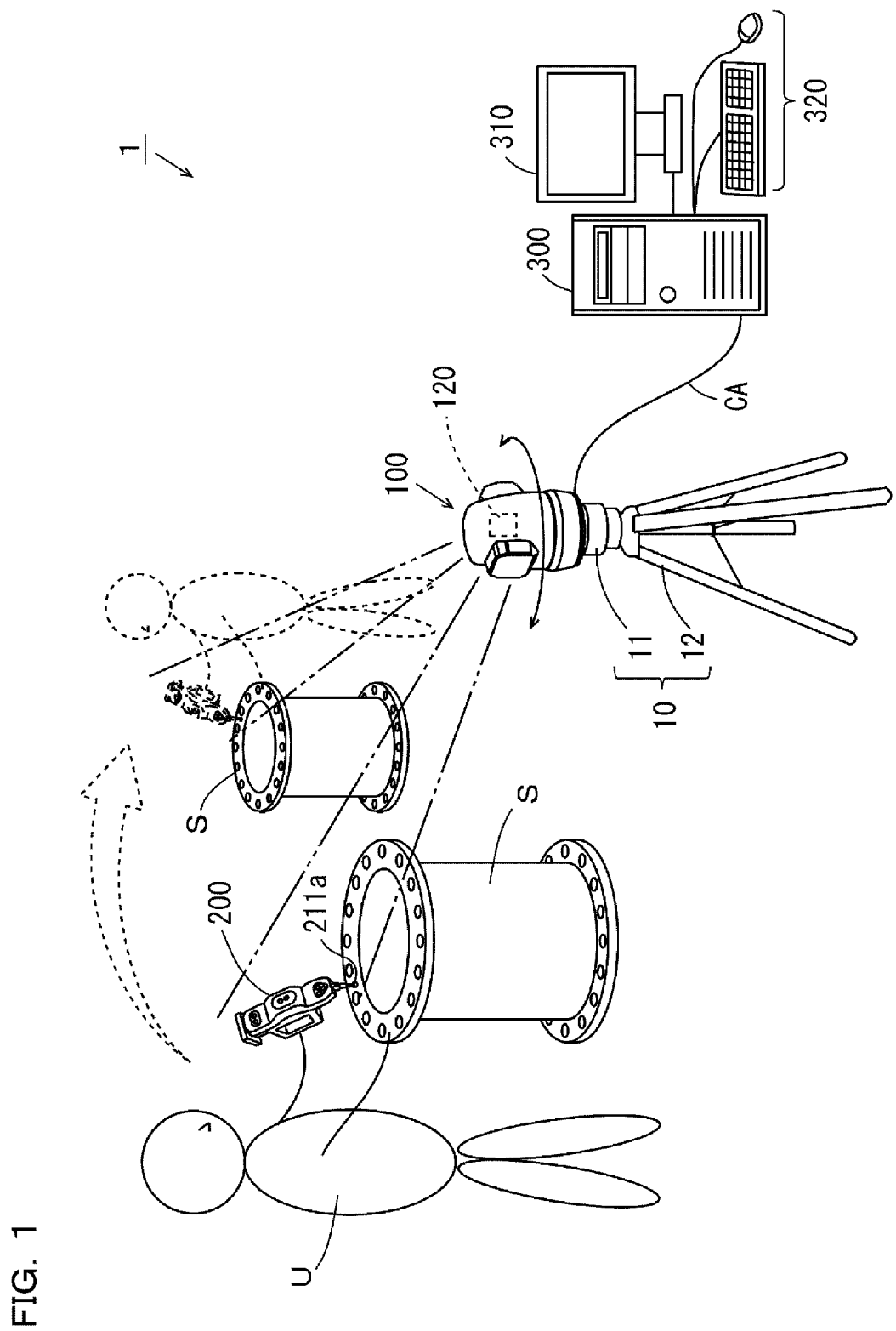
FIG. 1 is a schematic view illustrating an example of use of a three-dimensional coordinate measuring device according to an embodiment of the invention.

[1] Basic Structure and Example of Use of a Three-Dimensional Coordinate Measuring Device FIG. 1 is a schematic view illustrating an example of use of a three-dimensional coordinate measuring device according to an embodiment of the invention. As illustrated in FIG. 1, a three-dimensional coordinate measuring device 1 according to the embodiment of the invention mainly includes an imaging head 100, a probe 200, and a processing device 300 and is used to measure, for example, physical quantities such as the dimensions of portions of a large measurement target S. In the example in FIG. 1, a large pipe is illustrated as the measurement target S. The measurement target S is placed on a floor surface.

The probe 200 is carried by a user U. The probe 200 has a contact part 211a. The user U brings the contact part 211a of the probe 200 into contact with a desired portion of the measurement target S. The portion of the measurement target S that makes contact with the contact part 211a is a measurement point.

The imaging head 100 is fixed by a reference stand 10 to, for example, the floor surface as an installation surface. A movable camera 120 is provided in the imaging head 100. The movable camera 120 captures a plurality of markers eq (FIG. 9), which will be described later, provided on the probe 200. The reference stand 10 is a tripod stand and includes a fixing section 11 and a leg section 12. The fixing section 11 has a flat upper surface. The reference stand 10 is configured to enable posture adjustment between the fixing section 11 and the leg section 12 so that the upper surface of the fixing section 11 is fixed horizontally. The upper surface of the fixing section 11 is assumed to be fixed horizontally in the following description.

In addition, the imaging head 100 is connected to the processing device 300 via a cable CA. The processing device 300 is, for example, a personal computer to which a main body display unit 310 and a main body operation unit 320 are connected. In the processing device 300, the position of a measurement point on the measurement target S is calculated based on the image data (referred to below as measurement image data) obtained by capturing the probe 200 using the movable camera 120 and position/posture information described later. The coordinates of one or more measurement points on the measurement target S are calculated and the physical quantities of the measurement target S are measured based on the calculation result.

When the user U moves while carrying the probe 200, as illustrated in FIG. 1 by the dotted line arrow, the orientation of the imaging visual field of the movable camera 120 follows the movement of the probe 200. That is, the orientation of the movable camera 120 changes so that the probe 200 is positioned within the imaging visual field of the movable camera 120 when the probe 200 moves. Accordingly, the three-dimensional coordinate measuring device 1 has a wide measurable area. The structures of individual portions of the three-dimensional coordinate measuring device 1 will be described in detail below.

[2] Structures of the Imaging Head 100 and the Processing Device 300

Figure 2:
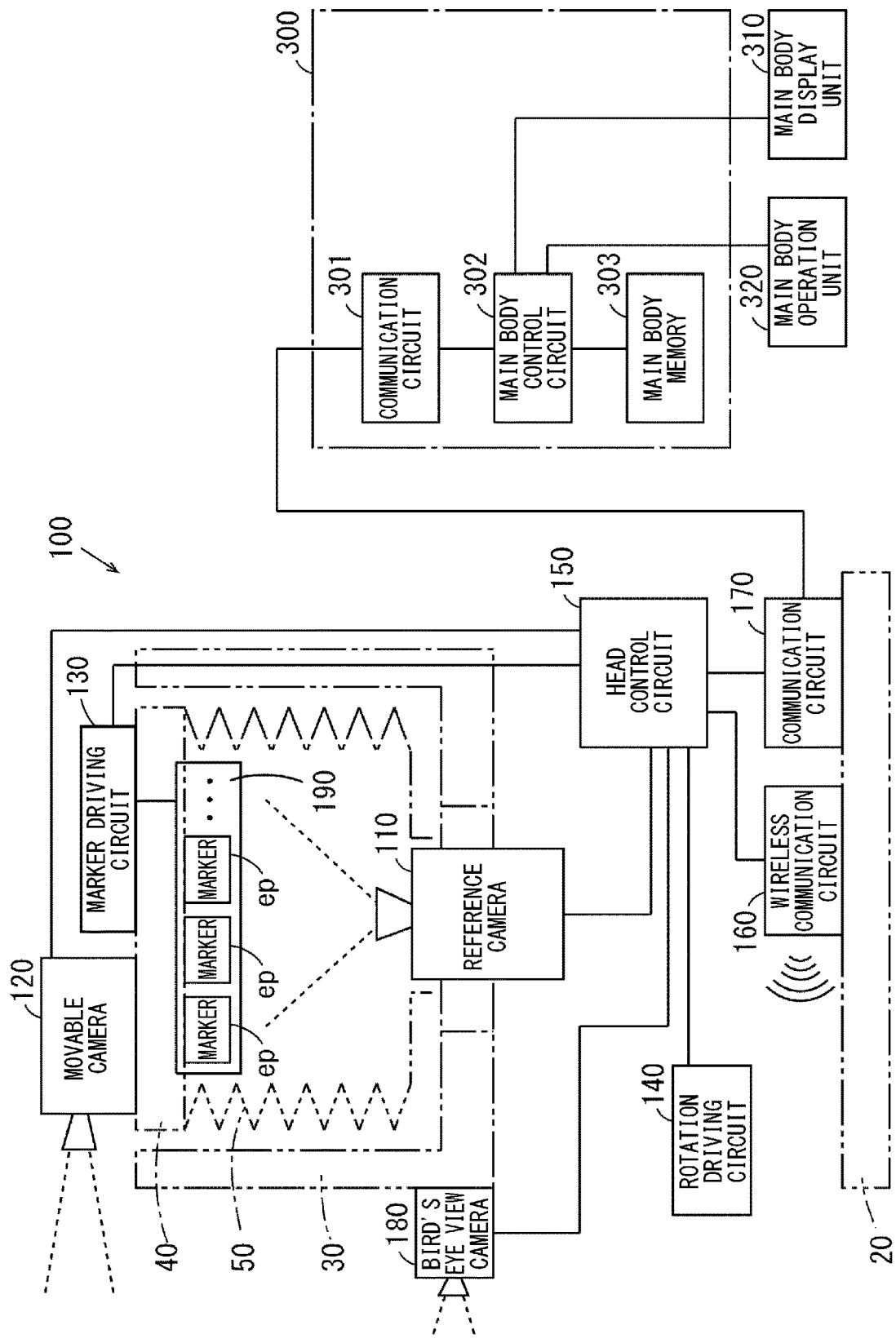
FIG. 2 is a block diagram illustrating the basic structures of an imaging head and a processing device.
Figure 3:
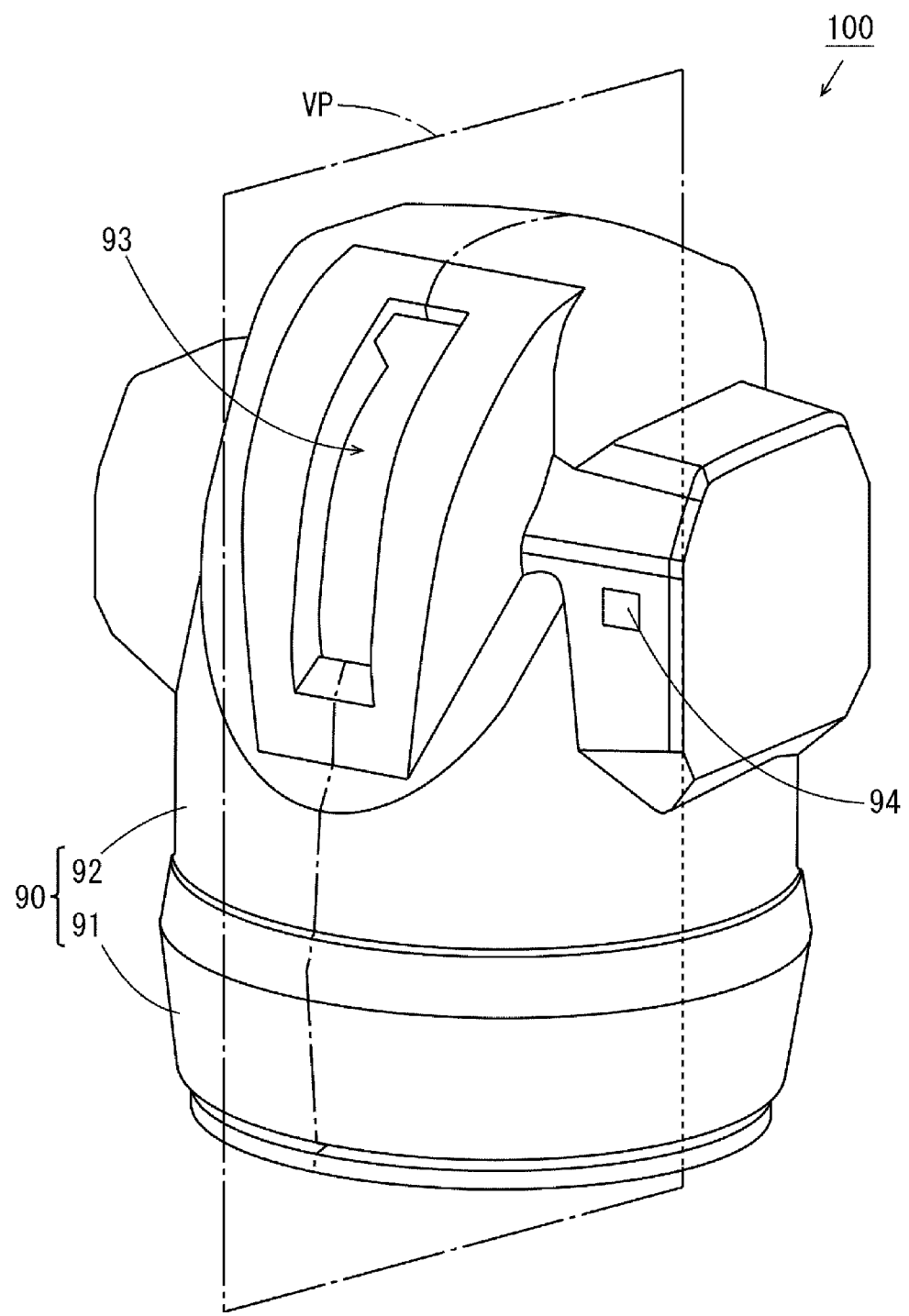
FIG. 3 is a perspective view illustrating the external appearance of the imaging head.
Figure 4:
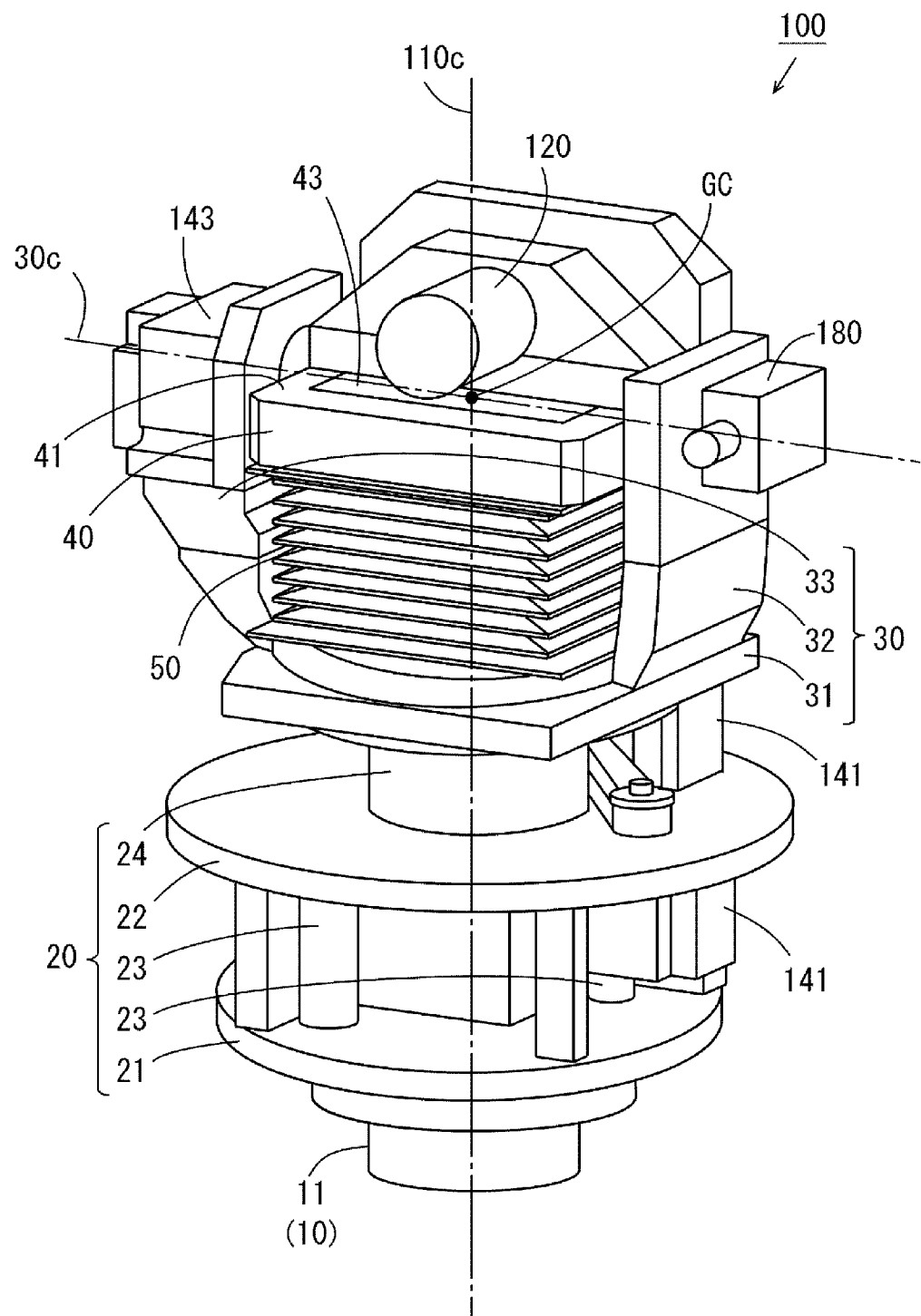
FIG. 4 is a perspective view illustrating the external appearance of the imaging head from which a casing has been removed.
Figure 5:
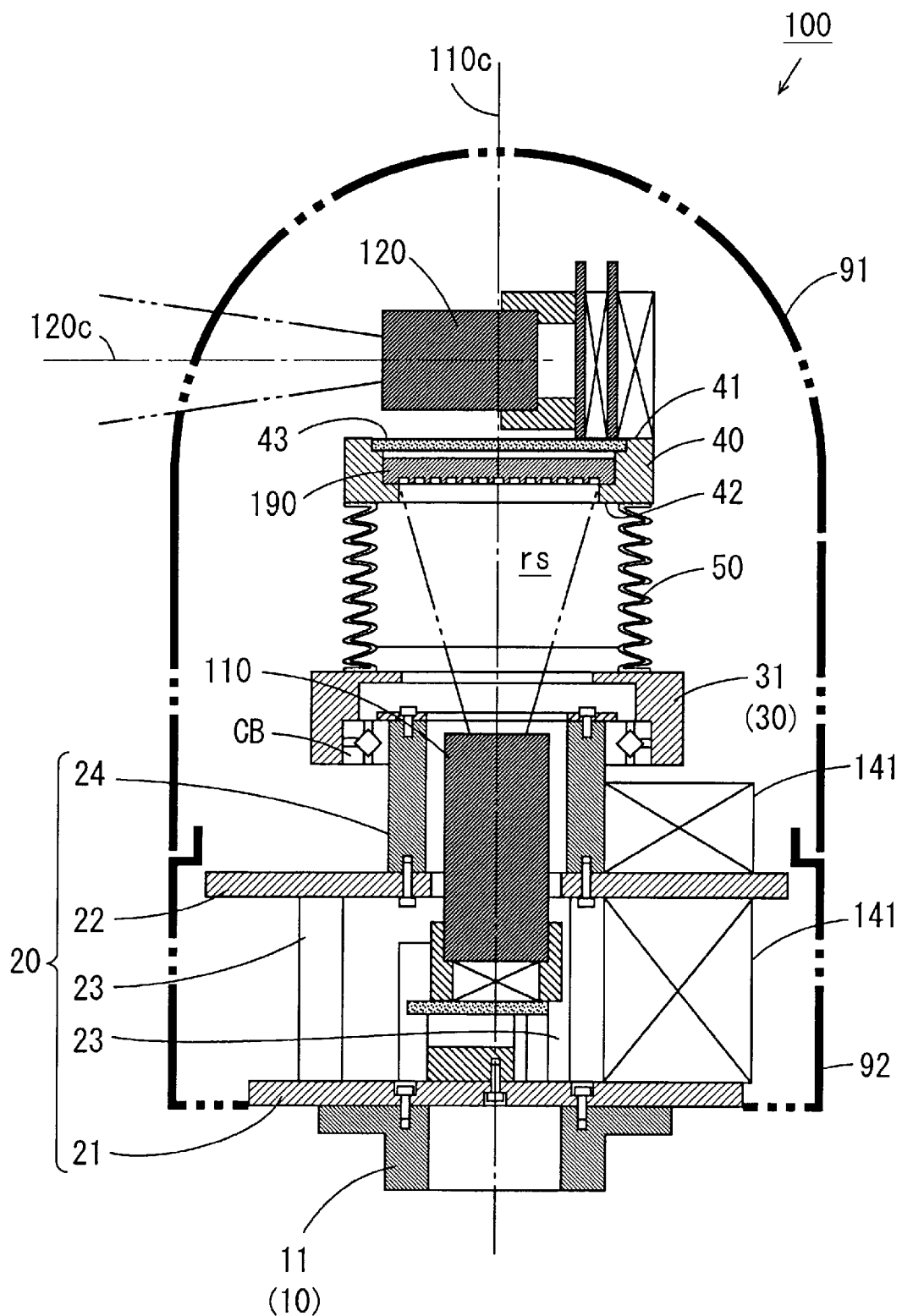
FIG. 5 is a schematic cross-sectional view illustrating the imaging head taken in a virtual plane in FIG. 3.

FIG. 2 is a block diagram illustrating the basic structures of the imaging head 100 and the processing device 300. FIG. 3 is a perspective view illustrating the external appearance of the imaging head 100, FIG. 4 is a perspective view illustrating the external appearance of the imaging head 100 from which a casing 90 has been removed, and FIG. 5 is a schematic cross-sectional view illustrating the imaging head 100 taken in a virtual plane VP in FIG. 3.

First, the structure of the imaging head 100 will be described. As illustrated in FIG. 2, the imaging head 100 includes a reference camera 110, the movable camera 120, a marker driving circuit 130, a rotation driving circuit 140, a head control circuit 150, a wireless communication circuit 160, a communication circuit 170, a bird's eye view camera 180, and the reference member 190 as electric components. These components are accommodated in the casing 90 illustrated in FIG. 3 in the state in which they are supported by one of a fixing and coupling section 20, a supporting member 30, and a movable member 40 indicated by dot-dot-dash lines in FIG. 2.

As illustrated in FIG. 3, the casing 90 includes a lower casing 91 and an upper casing 92. As illustrated in FIG. 3 and FIG. 5, the lower casing 91 is substantially cylindrical and extends upward a certain distance from the lower end part of the imaging head 100. The upper casing 92 is provided above the lower casing 91. The upper casing 92 is substantially bell-shaped and provided rotatably together with the supporting member 30 (FIG. 4), which will be described below, in a horizontal plane.

As illustrated in FIG. 3, a slit 93 extending in an up-down direction is formed in a part of the upper casing 92. The slit 93 guides the imaging visual field of the movable camera 120 to the outside of the casing 90. In addition, a window 94 for the bird's eye view camera is formed in the upper casing 92. The window 94 for the bird's eye view camera guides the imaging visual field of the bird's eye view camera 180 to the outside of the casing 90.

As illustrated in FIG. 4 and FIG. 5, the fixing and coupling section 20 includes the lower fixing plate 21, an upper fixing plate 22, a plurality of (for example, four) columns 23, and the hollow supporting shaft 24. The lower fixing plate 21 is disc-shaped and fixed to the upper surface of the fixing section 11 of the reference stand 10 with screws. The upper fixing plate 22 is provided above the lower fixing plate 21 via the plurality of columns 23. The upper fixing plate 22 is disc-shaped as the lower fixing plate 21. A circular opening is formed at the center of the upper fixing plate 22. The hollow supporting shaft 24 is fixed to the upper surface of the upper fixing plate 22 with screws so as to surround the opening at the center of the upper fixing plate 22. The lower casing 91 in FIG. 3 is attached to one of members that constitute the fixing and coupling section 20.

In the fixing and coupling section 20, the space between the lower fixing plate 21 and the upper fixing plate 22 is provided with various types of substrates on which the rotation driving circuit 140, the head control circuit 150, the wireless communication circuit 160, and the communication circuit 170 in FIG. 2 are mounted. In addition, on the lower fixing plate 21, the reference camera 110 is provided so as to extend from the lower fixing plate 21 to the inside of the hollow supporting shaft 24 through the opening of the upper fixing plate 22 as illustrated in FIG. 5. In this state, the imaging visual field of the reference camera 110 faces upward. In the embodiment, an optical axis 110c of the optical system of the reference camera 110 is aligned with the center axis of the hollow supporting shaft 24.

On the lower fixing plate 21 and the upper fixing plate 22, a horizontal rotation mechanism 141 is provided in addition to various types of substrates and the reference camera 110 described above. The horizontal rotation mechanism 141 is used to rotate the supporting member 30, which will be described later, about the center axis of the hollow supporting shaft 24 (in a plane parallel with the upper surface of the reference stand 10). The horizontal rotation mechanism 141 includes, for example, a motor and various types of power transmission members.

As illustrated in FIG. 4, the supporting member 30 is provided on the hollow supporting shaft 24 of the fixing and coupling section 20. The supporting member 30 includes the rotation base 31 and a pair of supporting frames 32 and 33. A rotation base 31 has an opening at the center thereof and is mounted to the upper end part of the hollow supporting shaft 24 via a cross roller bearing CB (FIG. 5) so that the supporting member 30 is rotatable about the center axis of the hollow supporting shaft 24. The upper casing 92 in FIG. 3 is mounted to one of the members that constitute the supporting member 30. When the supporting member 30 rotates with respect to the hollow supporting shaft 24, the upper casing 92 rotates together with the supporting member 30 relatives to the lower casing 91.

The pair of supporting frames 32 and 33 is formed so as to extend upward from one side and the other side of the rotation base 31 while facing each other. Between the pair of supporting frames 32 and 33, the movable member 40 is provided a predetermined distance apart from the rotation base 31.

The movable member 40 is supported by the supporting frames 32 and 33 so as to be rotatable (tiltable with respect to the horizontal plane) about a rotational axis 30c passing through the portions of the pair of supporting frames 32 and 33 facing each other. In the embodiment, the rotational axis 30c is orthogonal to the optical axis 110c of the reference camera 110 (FIG. 5) and the center axis of the hollow supporting shaft 24.

In the vicinity of the upper end part of the one supporting frame 32, the bird's eye view camera 180 is mounted in a portion positioned on the rotational axis 30c on a side opposite to the movable member 40. In the vicinity of the upper end part of the other supporting frame 33, a tilt rotation mechanism 143 is mounted in a portion positioned on the rotational axis 30c on a side opposite to the movable member 40. The tilt rotation mechanism 143 includes, for example, a motor and various types of power transmission members. The tilt rotation mechanism 143 rotates the movable member 40 about the rotational axis 30c. It should be noted here that the range in which the tilt rotation mechanism 143 can rotate the movable member 40 is limited to, for example, 60 degrees or so.

The movable member 40 is formed in a substantially square short cylinder and has an upper surface 41 and a lower surface 42. The movable camera 120 and various types of substrates that accompany the movable camera 120 are fixed to the movable member 40. In this state, an optical axis 120c (FIG. 5) of the optical system of the movable camera 120 is parallel with the upper surface 41 of the movable member 40.

A substrate 43 on which the marker driving circuit 130 in FIG. 2 is mounted is provided in the upper end part of the movable member 40 so as to close the opening at the center thereof.

Figure 6A:
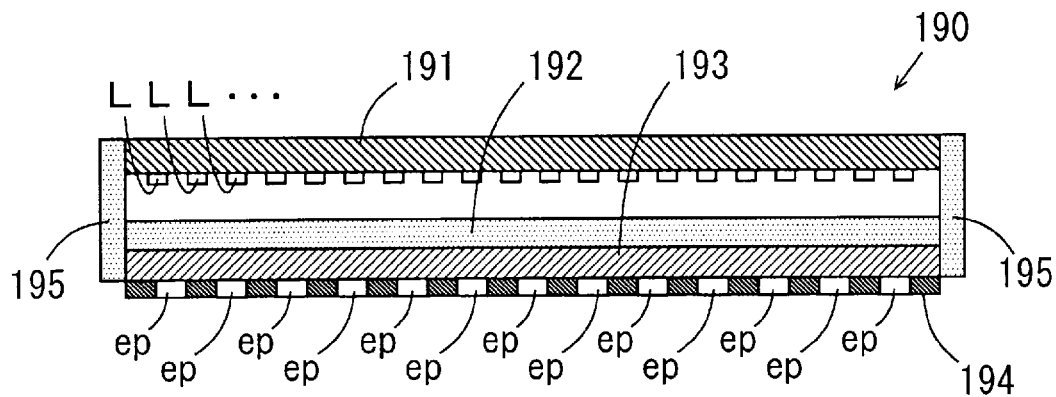
FIG. 6A is a schematic vertical sectional view illustrating a reference member in FIG. 5

As illustrated in FIG. 5, the reference member 190 having the plurality of markers ep (FIG. 2) is provided inside the movable member 40. FIG. 6A is a schematic longitudinal sectional view illustrating the reference member 190 in FIG. 5 and FIG. 6B is a bottom view illustrating the reference member 190.

Figure 6B:
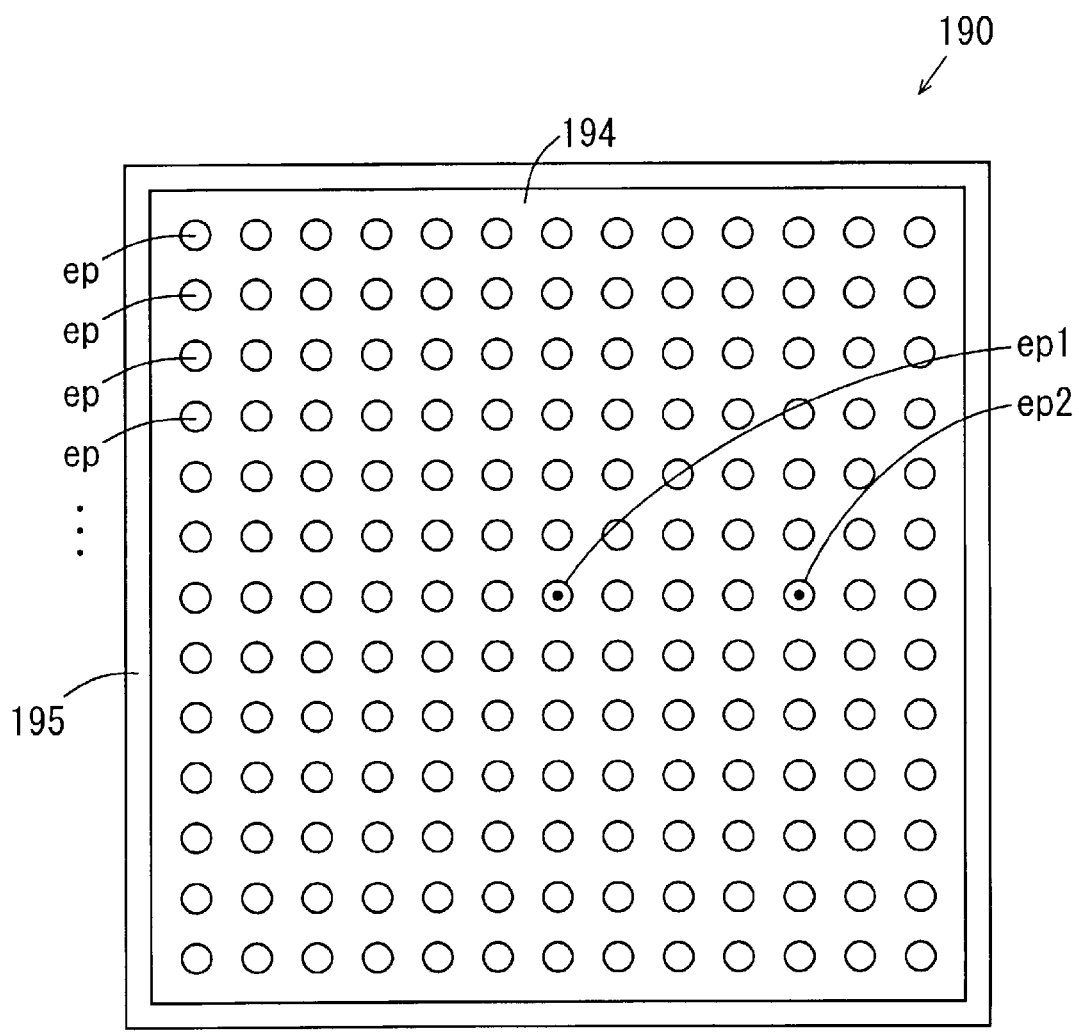
FIG. 6B is a bottom view illustrating the reference member.

As illustrated in FIGS. 6A and 6B, the reference member 190 includes a light emitting substrate 191, a diffusion plate 192, a glass plate 193, and a diffuse reflection sheet 195. The light emitting substrate 191, the diffusion plate 192, and the glass plate 193 are laminated in this order from above to below. The diffuse reflection sheet 195 is provided so as to surround the outer periphery part of this laminated body.

A plurality of light emitting elements L is mounted on the entire lower surface of the light emitting substrate 191. The light emitting elements L are, for example, infrared LEDs (light emitting diodes). As the light emitting elements L, LEDs emitting other wavelengths may be used instead of infrared LEDs or other types of light emitting elements such as filaments may be used. The marker driving circuit 130 drives the plurality of light emitting elements L on the light emitting substrate 191. This causes the plurality of light emitting elements L to emit light.

The diffusion plate 192 is a plate member made of, for example, resin and transmits light emitted from the plurality of light emitting elements L downward while diffusing the light. The diffuse reflection sheet 195 is a strip-shaped sheet member made of, for example, resin and reflects the light from the plurality of light emitting elements L toward the side (outside) of the reference member 190 inward while diffusing the light.

The glass plate 193 is a plate member made of, for example, quartz glass or soda glass. The lower surface of the glass plate 193 is provided with the mask 194 having a plurality of circular openings. The mask 194 is a chrome mask formed on the lower surface of the glass plate 193 by, for example, a sputtering method or a vapor depositing method.

In the structure described above, the light emitted from the plurality of light emitting elements L and diffused by the diffusion plate 192 and the diffuse reflection sheet 195 is released downward of the reference member 190 through the glass plate 193 and the plurality of circular openings of the mask 194. In this way, the plurality of self-emission markers ep corresponding to the plurality of circular openings, respectively, is formed.

In the embodiment, as illustrated in FIG. 6B, the plurality of markers ep is arranged at regular intervals in a matrix on the lower surface (plane) of the reference member 190. Of the plurality of markers ep, the marker ep located at the center and one marker ep present in a position at a predetermined distance from the marker ep at the center are denoted by identification marks (points in this example) to identify these two markers from the other markers ep. These identification marks are formed by a part of the mask 194.

In the following description, to distinguish these two markers ep denoted by the identification marks from the other markers ep, the marker ep at the center with the identification mark is referred to as a first marker ep1. In addition, the other marker ep having the identification mark is referred to as a second marker ep2.

In the structure described above, the reference member 190 is attached to the movable member 40 so that the plurality of markers ep facing downward is positioned within the range of the imaging visual field of the reference camera 110. In addition, the reference member 190 is attached to the movable member 40 so that the first marker ep1 is positioned on the optical axis 110c when the upper surface 41 and the lower surface 42 of the movable member 40 are orthogonal to the direction of the optical axis 110c of the reference camera 110. It should be noted here that reference member 190 is preferably disposed so that most of the plurality of markers ep are distributed to the entire imaging visual field of the reference camera 110.

When the supporting member 30 rotates on the fixing and coupling section 20 and when the movable member 40 rotates about the rotational axis 30c, the image of the plurality of markers ep obtained when the reference camera 110 captures the reference member 190 are changed.

Figure 7A:
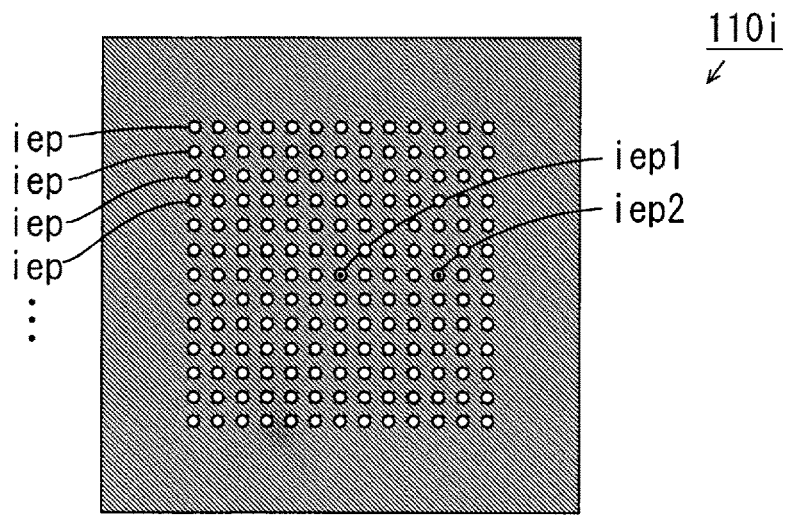
FIGS. 7A, 7B, and 7C illustrate examples of images of a plurality of markers obtained by capturing the reference member using a reference camera.
Figure 7B:
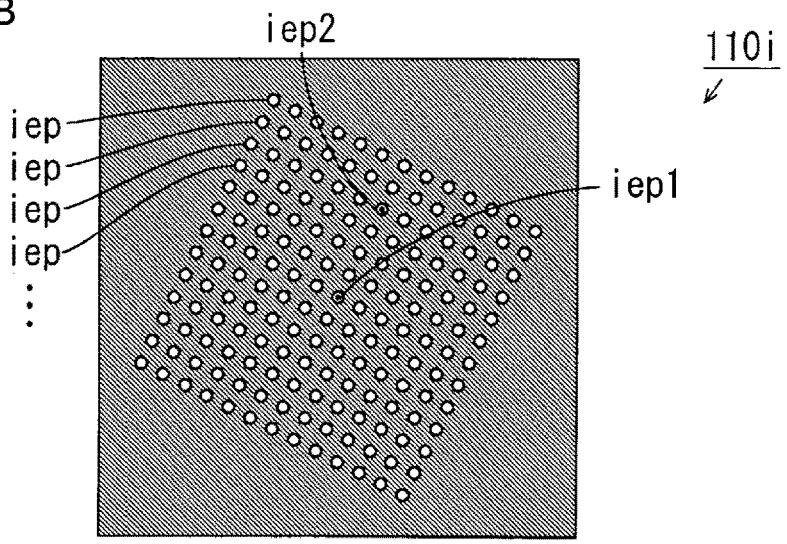
Figure 7C:
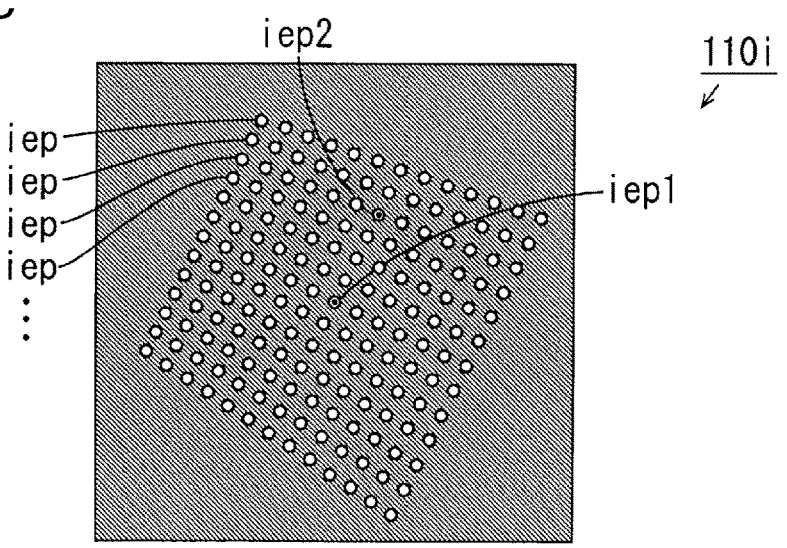

FIGS. 7A to 7C illustrate examples of the images of the plurality of markers ep obtained when the reference camera 110 captures the reference member 190. Since light is released from the plurality of markers ep in FIG. 6B, the images corresponding to the plurality of markers ep appear in the image of the reference member 190 captured by the imaging head 100.

For example, when the supporting member 30 and the movable member 40 are held in their predetermined reference postures, an image 110i illustrated in FIG. 7A is assumed to be obtained. In the reference postures, the lower surface of the reference member 190 is orthogonal to the optical axis 110c of the reference camera 110 and held horizontally. In the image 110i in FIG. 7A, marker images iep corresponding to the plurality of markers ep, respectively, are arranged in a matrix as in the plurality of actual markers ep in FIG. 6B. In addition, the marker image iep1 corresponding to the first marker ep1 in FIG. 6B is illustrated in the central part of the image corresponding to the center of the visual field of the reference camera 110. In addition, a marker image iep2 corresponding to the second marker ep2 in FIG. 6B is illustrated in a position spaced apart a predetermined distance from the marker image iep1.

When the supporting member 30 rotates about the optical axis 110c from the reference posture, the distances between the plurality of markers ep and the reference camera 110 do not change significantly. In this rotation, as illustrated in FIG. 7B, the plurality of marker images iep rotates about the central part of the image. In this case, the rotation angle of the supporting member 30 from the reference posture can be obtained based on the positional relationship between the two marker images iep1 and iep2.

When the movable member 40 rotates about the rotational axis 30c from the reference posture, the distances between the plurality of markers ep and the reference camera 110 change individually. For example, the distances between parts of the plurality of markers ep and the reference camera 110 become smaller and the distances between other parts of the plurality of markers ep and the reference camera 110 become larger. Accordingly, when, for example, the movable member 40 rotates from the reference posture in the state in which the supporting member 30 is held in the rotation position corresponding to the image 110i in FIG. 7B, the state of arrangement of the plurality of marker images iep changes as illustrated in FIG. 7C. In this case, the rotation angle of the movable member 40 from the reference posture can be obtained based on the positional relationship of all marker images iep including the two marker images iep1 and iep2.

As described above, the movable camera 120 and the reference member 190 are integrally fixed to the movable member 40. Accordingly, the position and the posture of the movable camera 120 with respect to the reference camera 110 can be calculated based on the imaging data (referred to below as the reference image data) obtained by capturing the plurality of markers ep of the reference member 190 using the reference camera 110. Details on calculation of the position and the posture of the movable camera 120 will be described later.

Between the movable member 40 and the rotation base 31, a bellows 50 is provided to spatially blocks an imaging space rs (FIG. 5) including the imaging visual field of the reference camera 110 from the reference camera 110 to the reference member 190, from the outside of the imaging space rs.

The upper end part of the bellows 50 is coupled to the lower surface 42 of the movable member 40 and the lower end part of the bellows 50 is coupled to the upper surface of the rotation base 31. Accordingly, when the supporting member 30 rotates in the horizontal plane, the bellows 50 also rotates together with the supporting member 30.

In addition, the bellows 50 in this example is formed in a substantially square column and, when the tilt rotation mechanism 143 rotates the movable member 40, deformed following the rotation, thereby maintaining the optical and spatial block state of the imaging space rs. In addition, when the bellows 50 is deformed following the rotation of the movable member 40, the bellows 50 is provided so as not to interfere with the imaging visual field of the reference camera 110.

This structure prevents light from entering the imaging space rs from the outside of the imaging space rs. In addition, even when a motor or the like is heated around the imaging space rs, the generated heat is prevented from entering the imaging space rs. This prevents the atmosphere of the imaging space rs from fluctuating. Accordingly, since the plurality of markers ep is captured with high accuracy, the position and the posture of the movable camera 120 with respect to the reference camera 110 can be calculated with high accuracy.

In addition, in the structure described above, since the inner space of the bellows 50 is spatially blocked from the outer space, the atmosphere of the inner space of the bellows becomes stable. Accordingly, the heat source provided outside the bellows 50 can be forcibly cooled by a fan or the like.

It should be noted here that the inner surface of the bellows 50 that faces the imaging space rs is preferably configured by a color or material that has a small light reflectivity and absorbs light. For example, the color of the inner surface of the bellows 50 may be black. Alternatively, the inner surface of the bellows 50 may be configured by a nonreflective material that does not reflect light. Alternatively, the inner surface of the bellows 50 may be coated with a nonreflective material. This prevents light released by the plurality of markers ep from being irregularly reflected by the inner surface of the bellows 50. Accordingly, the plurality of markers ep can be captured with high accuracy.

In the imaging head 100, as illustrated in FIG. 4, the movable camera 120 is preferably provided so that the barycenter of the movable camera 120 approaches an intersection point GC between the optical axis 110c of the reference camera 110 and the rotational axis 30c. In this case, as the barycenter of the movable camera 120 is closer to the intersection point GC, the rotation of the supporting member 30 about the optical axis 110c becomes more stable and the rotation of the movable member 40 about the rotational axis 30c becomes more stable. In addition, the driving force required to rotate the supporting member 30 and the movable member 40 can be reduced. This reduces the load applied to the driving units such as the motor.

As illustrated in FIG. 4, the bird's eye view camera 180 is provided on the supporting frame 32 so that the imaging visual field thereof is oriented in the same or substantially the same direction as the imaging visual field of the movable camera 120. The angle of view of the bird's eye view camera 180 is larger than the angles of view of the reference camera 110 and the movable camera 120. Accordingly, the imaging visual field of the bird's eye view camera 180 is larger than the imaging visual fields of the reference camera 110 and the movable camera 120. It should be noted here that the angle of view of the movable camera 120 is set, for example, so as to cover a circular area with a diameter of 15 cm or so at a position 1.5 meters apart from the movable camera 120.

In tracking processing, which will be described later, the bird's eye view camera 180 is used to capture the probe 200 over a wide range. Even when, for example, the probe 200 deviates from the imaging visual field of the movable camera 120 due to the movement of the probe 200 in this case, by capturing the probe 200 using the bird's eye view camera 180, the approximate position of the probe 200 can be specified based on the image data (referred to below as bird's eye view image data) by the capturing. The position and posture of the movable camera 120 are adjusted based on the specified position so that the probe 200 is positioned in the imaging visual field of the movable camera 120.

As illustrated in FIG. 2, the reference camera 110, the movable camera 120, the marker driving circuit 130, the rotation driving circuit 140, the wireless communication circuit 160, and the communication circuit 170 are connected to the head control circuit 150. The head control circuit 150 includes a CPU (central processing unit) and a memory or a microcomputer and controls the reference camera 110, the movable camera 120, the marker driving circuit 130, and the rotation driving circuit 140.

Each of the reference camera 110, the movable camera 120, and the bird's eye view camera 180 includes a CMOS (complementary metal oxide film semiconductor) image sensor capable of detecting infrared light, as an imaging element. In addition, each of the reference camera 110, the movable camera 120, and the bird's eye view camera 180 includes a plurality of lenses (optical systems), which is not illustrated.

As described above, the pixels of the reference camera 110, the movable camera 120, and the bird's eye view camera 180 output the analog electric signals (referred to below as light-receiving signals) corresponding to the detection amount of to the head control circuit 150.

An A/D converter (analog-to-digital converter) and a FIFO (first-in first-out) memory, which are not illustrated, are mounted on the head control circuit 150. The light-receiving signals output from the reference camera 110, the movable camera 120, and the bird's eye view camera 180 are sampled by the A/D converter of the head control circuit 150 at a constant sampling period and converted into digital signals. The digital signals output from the A/D converter are accumulated in FIFO memory in sequence. The digital signals accumulated in the FIFO memory are transferred to the processing device 300 in sequence as pixel data.

The marker driving circuit 130 drives the light emitting substrate 191 in FIG. 6A under control of the head control circuit 150. This causes the plurality of light emitting elements L on the light emitting substrate 191 to emit light and the plurality of markers ep of the reference member 190 to release light. It should be noted here that this light emission timing synchronizes with the capturing timing of the reference camera 110.

The rotation driving circuit 140 drives the horizontal rotation mechanism 141 in FIG. 4 under control of the head control circuit 150. This rotates the supporting member 30 in FIG. 4 on the fixing and coupling section 20 and rotates the movable member 40 and the upper casing 92 (FIG. 3). At this time, since the movable member 40 rotates, the imaging visual field of the movable camera 120 introduced from the inside to the outside of the upper casing 92 through the slit 93 (FIG. 3) rotates in a horizontal direction on the reference stand 10 in FIG. 1.

In addition, the rotation driving circuit 140 drives the tilt rotation mechanism 143 in FIG. 4 under control of the head control circuit 150. This rotates the movable member 40 in FIG. 4 about the rotational axis 30c between the pair of supporting frames 32 and 33. At this time, the imaging visual field of the movable camera 120 that passes through the slit 93 (FIG. 3) rotates in an up-down direction along the slit 93 on the reference stand 10 in FIG. 1. The rotation of the imaging visual field of the movable camera 120 by the rotation driving circuit 140 is performed based on tracking processing, which will be described later, by the processing device 300.

The head control circuit 150 performs wireless communication with the probe 200 via the wireless communication circuit 160. In addition, the head control circuit 150 performs wired communication with the processing device 300 via the communication circuit 170 and the cable CA (FIG. 1).

As illustrated in FIG. 2, the processing device 300 includes a communication circuit 301, a main body control circuit 302, and a main body memory 303. The communication circuit 301 and the main body memory 303 are connected to the main body control circuit 302. In addition, a main body operation unit 320 and a main body display unit 310 are connected to the main body control circuit 302.

The main body memory 303 includes a ROM (read-only memory), a RAM (random access memory), and a hard disk. The main body memory 303 stores a measurement processing program, a tracking processing program, a calibration program, and a calibration decision program, which will be described later, as well as a system program. In addition, the main body memory 303 stores the camera parameters of the reference camera 110. The camera parameters of the reference camera 110 include a value concerning strain components that are caused by the lens and included in the reference image data and a value concerning the relative positional relationship between the lens and the imaging device. In addition, the main body memory 303 stores, as reference marker information, information indicating the relative positional relationship (defined in design) between the plurality of markers ep of the reference member 190. Specific examples of the camera parameters and the reference marker information will be described later. In addition, the main body memory 303 is used to process various types of data or store various types of data such as pixel data given by the imaging head 100.

The main body control circuit 302 includes a CPU. In the embodiment, the main body control circuit 302 and the main body memory 303 are achieved by a personal computer. The main body control circuit 302 generates image data based on pixel data given from the imaging head 100 via the cable CA (FIG. 1) and the communication circuit 301. The image data is a set including a plurality of pieces of pixel data.

In the embodiments, reference image data, measurement image data, and bird's eye view image data that correspond to the reference camera 110, the movable camera 120, and the bird's eye view camera 180 provided on the imaging head 100, respectively, are generated. In addition, image data corresponding to a probe camera 208, described later, that is provided on the probe 200 is generated. The main body control circuit 302 calculates the position of the contact part 211a (FIG. 1) of the probe 200 based on the camera parameter of the reference camera 110, the reference image data, and the measurement image data when the shape of the measurement target S is measured. In addition, the main body control circuit 302 calculates appropriate camera parameters of the reference camera 110 as new camera parameters. In addition, the main body control circuit 302 updates the camera parameters of the reference camera 110 stored in the main body memory 303 to the new camera parameters. This calibrates the reference camera 110. Details on various functions of the main body control circuit 302 will be described later.

The main body display unit 310 is configured by, for example, a liquid crystal display panel or an organic EL (electroluminescence) panel. The main body display unit 310 displays the positions of measurement points on the measurement target S, the measurement results of individual portions of the measurement target S, and the like based on control by the main body control circuit 302. In addition, the main body display unit 310 displays a setting screen on which various settings about measurement are made.

The main body operation unit 320 includes a keyboard and a pointing device. The pointing device includes a mouse, a joystick, or the like. The main body operation unit 320 is operated by the user U.

[3] Structure of the Probe 200

Figure 8:
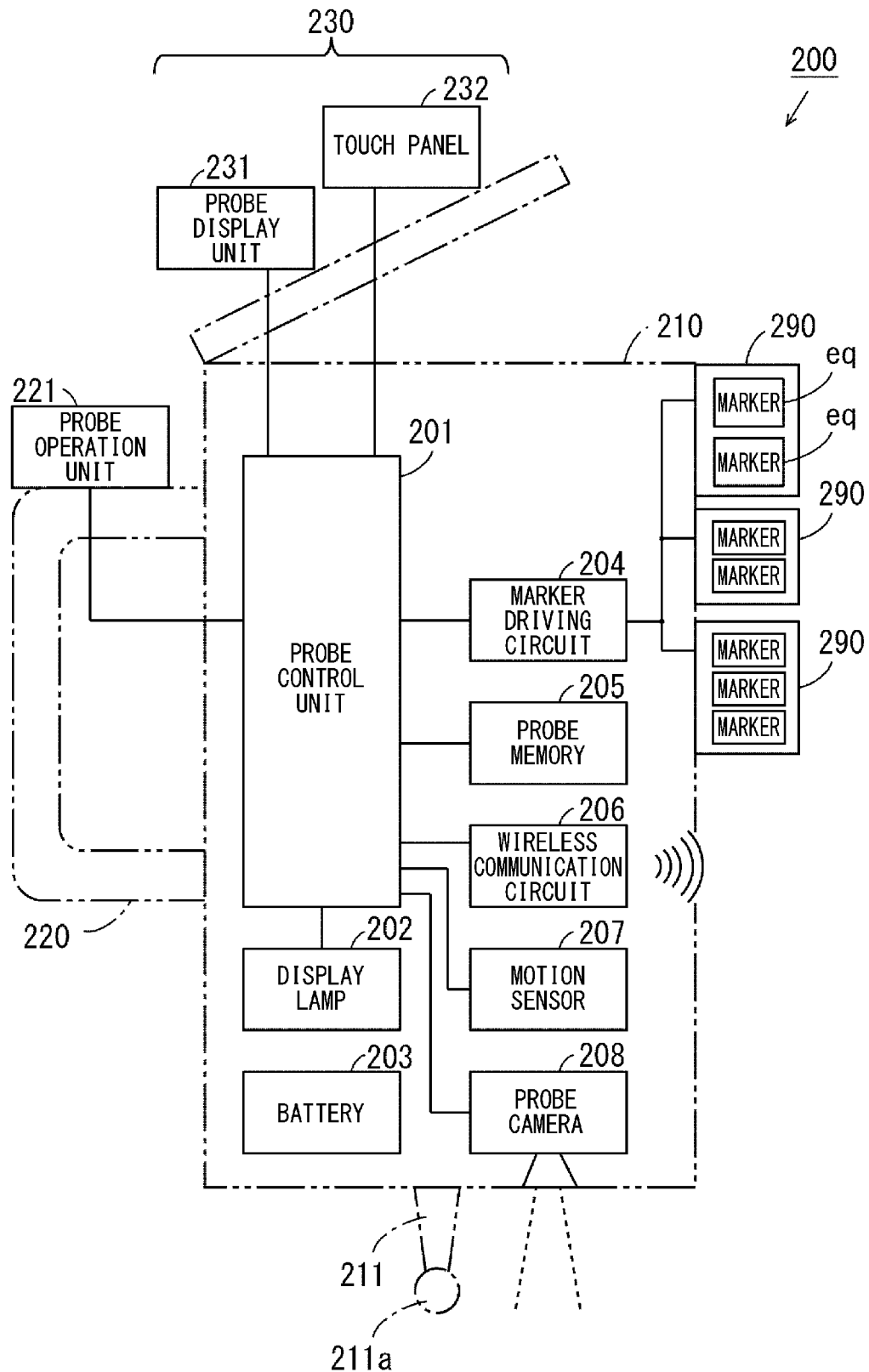
FIG. 8 is a block diagram illustrating the structure of a probe.
Figure 9:
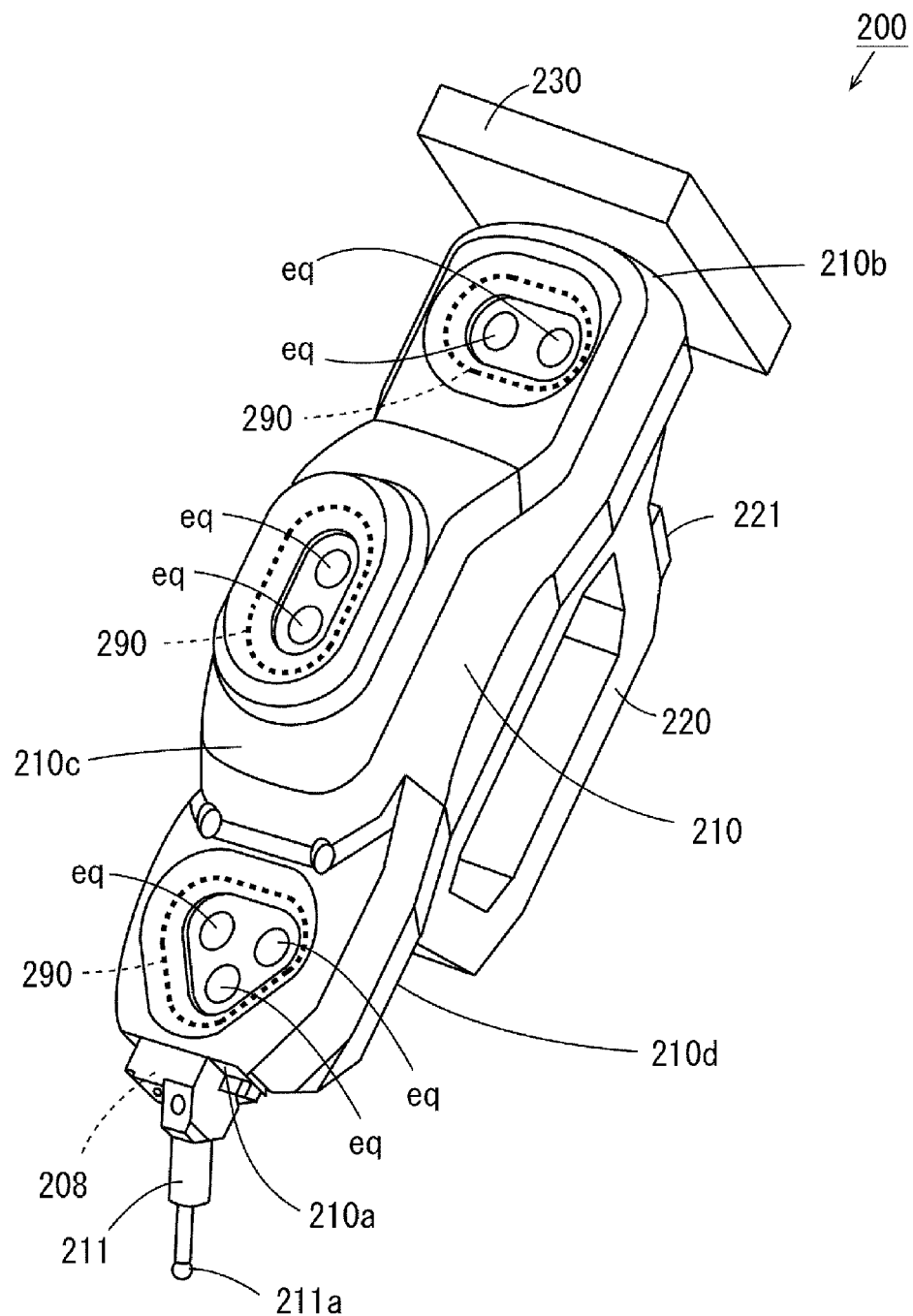
FIG. 9 is a perspective view illustrating the external appearance of the probe.

FIG. 8 is a block diagram illustrating the structure of the probe 200. FIG. 9 is a perspective view illustrating the external appearance of the probe 200. As illustrated in FIG. 8, the probe 200 includes a probe control unit 201, a display lamp 202, a battery 203, a marker driving circuit 204, a probe memory 205, a wireless communication circuit 206, a motion sensor 207, the probe camera 208, a probe operation unit 221, a touch panel display 230, and a plurality of (three in this example) target members 290 as electric components.

The battery 203 supplies electric power to other components provided in the probe 200. The probe control unit 201 includes a CPU and a memory or a microcomputer and controls the display lamp 202, the marker driving circuit 204, the probe camera 208, and the touch panel display 230. In addition, the probe control unit 201 performs various types of processings in response to the operation of the probe operation unit 221 and the touch panel display 230 by the user U.

As indicated by a dot-dot-dash line in FIG. 8, the probe 200 has a probe casing 210 that accommodates or supports the components described above and a grip part 220. The probe control unit 201, the display lamp 202, the battery 203, the marker driving circuit 204, the probe memory 205, the wireless communication circuit 206, the motion sensor 207, and the probe camera 208 are accommodated in the probe casing 210. The plurality of target members 290 is provided on an upper surface part 210c (FIG. 9), which will be described later, of the probe casing 210. The probe operation unit 221 is a button that can be pushed and provided in the grip part 220.

The touch panel display 230 includes a probe display unit 231 and a touch panel 232. The probe display unit 231 is configured by, for example, a liquid crystal display panel or an organic EL panel.

The display lamp 202 includes, for example, one or more LEDs and a light emitting section thereof is provided so as to be exposed to the outside of the probe casing 210. The display lamp 202 emits light according to the state of the probe 200 under control of the probe control unit 201.

The three target members 290 have basically the same structure as the reference member 190 in FIGS. 6A and 6B. The marker driving circuit 204 is connected to the plurality of target members 290 and drives a plurality of light emitting elements included in the target members 290 under control of the probe control unit 201.

The probe memory 205 includes a recording medium such as a non-volatile memory or a hard disk. The probe memory 205 is used to process various types of data or store various types of data such as image data given by the imaging head 100.

The motion sensor 207 detects the movement of the probe 200 when, for example, the user U moves while carrying the probe 200. For example, the motion sensor 207 detects the movement direction, the acceleration, the posture, and the like when the probe 200 moves. The probe camera 208 is, for example, a CCD (charge-coupled device) camera.

An A/D converter and a FIFO memory, which are not illustrated, are mounted in the probe control unit 201 in addition to the CPU and the memory or the microcomputer described above. Accordingly, in the probe control unit 201, signals indicating the motion of the probe 200 detected by the motion sensor 207 are converted to data of digital signal type (referred to below as motion data). In addition, the probe control unit 201 converts light-receiving signals output from pixels of the probe camera 208 to a plurality of pieces of pixel data of digital signal type. The probe control unit 201 transmits, via wireless communication, the digital motion data and the plurality of pieces of pixel data to the imaging head 100 in FIG. 2 through the wireless communication circuit 206. In this case, the motion data and the plurality of pieces of pixel data are further transferred to the processing device 300 from the imaging head 100.

As illustrated in FIG. 9, the probe casing 210 is formed so as to extend in one direction and has a front end part 210a, a rear end part 210b, the upper surface part 210c, and a bottom surface part 210d. The bottom surface part 210d is provided with the grip part 220. The grip part 220 is formed so as to extend in parallel with the probe casing 210. The probe operation unit 221 is provided in the part of the grip part 220 close to the rear end part 210b of the probe casing 210.

The rear end part 210b of the probe casing 210 is provided with the touch panel display 230. The front end part 210a is provided with a stylus 211. The stylus 211 is a rod-like member having the contact part 211a at a tip thereof. The front end part 210a further has the probe camera 208.

The upper surface part 210c of the probe casing 210 is provided with the three target members 290 arranged from the front end part 210a to the rear end part 210b. Of the three target members 290 in this example, the target member 290 closest to the front end part 210a has the three markers eq.

Each of the two remaining target members 290 has the two markers eq. The markers eq are self-emission markers that emit infrared light. It should be noted here that the emission timing of the plurality of markers eq synchronizes with the capturing timing of the movable camera 120 of the imaging head 100.

The user U grasps the grip part 220 so that the upper surface part 210c of the probe casing 210 faces the imaging head 100. In this state, the user U brings the contact part 211a into contact with a desired part of the measurement target S. In addition, the user U operates the probe operation unit 221 and the touch panel display 230 while visually recognizing an image displayed on the touch panel display 230.

[4] Method for Calculating the Coordinates of a Measurement Point

In the three-dimensional coordinate measuring device 1 according to the embodiment, a three-dimensional coordinate system (referred to below as a world coordinate system) having a predetermined relationship with respect to, for example, the reference stand 10 is defined. In addition, a three-dimensional coordinate system (referred to below as a reference camera coordinate system) having a predetermined relationship with respect to the reference camera 110 is defined. In addition, a three-dimensional coordinate system (referred to below as a movable camera coordinate system) having a predetermined relationship with respect to the movable camera 120 is defined.

When the shape of the measurement target S is measured, the movable camera 120 captures the probe 200 and generates measurement image data. The measurement image data can be used to calculate the coordinates in the movable camera coordinate system of the positions of the plurality of markers eq. In the probe 200, a certain positional relationship is present between the plurality of markers eq and the contact part 211a. Accordingly, the coordinates in the movable camera coordinate system of the position of a measurement point on the measurement target S can be calculated based on the calculated coordinates of the plurality of markers eq.

The posture of the movable camera 120 change when at least one of the supporting member 30 and the movable member 40 rotates. Accordingly, the relationship between the movable camera coordinate system and the world coordinate system changes as the position and the posture of the movable camera 120 change. The coordinates in the world coordinate system of the position of the measurement point are necessary to measure the shape of the measurement target S. Accordingly, the coordinates in the movable camera coordinate system of the measurement point need to undergo coordinate conversion so that the coordinates are represented in the world coordinate system according to the position and the posture of the movable camera 120.

This coordinate conversion is achieved by using information (referred to below as position/posture information) indicating the position and the posture of the movable member 40 with respect to the reference camera 110 fixed to the reference stand 10.

The method for calculating position/posture information will be described. Position/posture information includes a rotation matrix and a translation matrix and is represented by an expression (1) below when the elements of the rotation matrix are r11, r12, r13, r21, r22, r23, r31, r32, and r33 and the elements of the translation matrix are tx, ty, and tz.

$$\begin{pmatrix} r11 & r12 & r13 & tx \\ r21 & r22 & r23 & ty \\ r31 & r32 & r33 & tz \end{pmatrix} \quad (1)$$

The coordinates in the world coordinate system of the position of one marker ep are assumed to be (X, Y, Z) and the coordinates in the reference camera coordinate system of the position of one marker ep are assumed to be (Xc, Yc, Zc). In this case, expressions (2), (3), and (4) below hold using the elements of the matrixes illustrated in the expression (1).

$$Xc = r11X + r12Y + r13Z + tx \quad (2)$$

$$Yc = r21X + r22Y + r23Z + ty \quad (3)$$

$$Zc = r31X + r32Y + r33Z + tz \quad (4)$$

The reference camera 110 is assumed to be a pin-hole camera and the coordinates in the reference camera coordinate system of the projected image of one marker ep on the light receiving surface of an imaging device are assumed to be (u, v). In this case, when the distance (focal length) from the light receiving surface to the optical center (principal point of the lens) in the reference camera 110 is assumed to be f, expressions (5) and (6) below hold based on the relationship of similarity.

$$u/f = Xc/Zc \quad (5)$$

$$v/f = Yc/Zc \quad (6)$$

The expressions (5) and (6) can be deformed to expressions (7) and (8) below, respectively, using expressions (2), (3), and (4).

$$u/f - (r11X + r12Y + r13Z + tx)/(r31X + r32Y + r33Z + tz) = 0 \quad (7)$$

$$v/f - (r21X + r22Y + r23Z + ty)/(r31X + r32Y + r33Z + tz) = 0 \quad (8)$$

The above two expressions (7) and (8) are generated for one marker ep. Accordingly, when the total number of markers ep of the reference member 190 is assumed to be N, (N×2) expressions can be generated.

The coordinates (u, v) can be acquired based on the projected images of the markers ep on the light receiving surface in the reference camera 110. The positional relationship between the plurality of markers ep is stored as reference marker information in the main body memory 303. Accordingly, the X, Y, and Z values described above are known values that can be derived based on the positional relationship with respect to the first and second markers ep1 and ep2 using reference marker information.

Accordingly, when the focal length f of the reference camera 110 is known and N is equal to or more than a predetermined value, all elements (position/posture information) of the rotation matrix and the translation matrix can be acquired by a method like the least-square technique based on (N×2) expressions (simultaneous equations).

In this case, the larger the number N of markers ep, the higher the reliability of the rotation matrix and the translation matrix to be calculated. In consideration of this, the reference member 190 according to the embodiment has, for example, approximately 400 markers ep.

[5] Camera Parameters and Calibration of the Reference Camera 110

The images of the plurality of markers ep actually projected onto the light receiving surface of the imaging device in the reference camera 110 include strain components caused by the lens and deviation components caused by the positional relationship between the lens and the imaging device. In contrast, the coordinates (u, v) of projected images used in the above expressions (5) to (8) assume a pin-hole camera model in which strain components and deviation components are not present in projected images on the light receiving surface in the reference camera 110. Accordingly, the coordinates of projected image actually projected onto the light receiving surface from one marker ep need to be corrected to accurately acquire the coordinates (u, v) of the projected images for calculating position/posture information.

It is assumed that the coordinates in the reference camera coordinate system of the position of one marker ep are (x, y, z) and the coordinates (x/z, y/z) of a projected image of one marker ep projected onto a normalized plane are (x', Y').

In this case, the deviation amount x", y" (caused by the lens) of the projected image of one marker ep projected onto the normalized plane can be represented by the following expressions (9) and (10).

$$x''=x'(1+k1r^2+k2r^4+k3r^6)+2p1x'y'+p2(r^2+2x'^2) \quad (9)$$

$$y''=y'(1+k1r^2+k2r^4+k3r^6)+p1(r^2+2y'^2)+2p2x'y' \quad (10)$$

In these expressions (9) and (10), $r^2=x'^2+y'^2$. In addition, in the expressions (9) and (10), k1, k2, and k3 are correction coefficients for correcting strain components in the radial direction of the lens and p1 and p2 are correction coefficients for correcting strain components in the tangential direction of the lens.

If the above deviation amount x", y" can be acquired, the coordinates (u, v) of the projected image for calculating position/posture information can be calculated by the following expressions (11) and (12) using the focal length f.

$$u=f\times x''+u0 \quad (11)$$

$$v=f\times y''+v0 \quad (12)$$

In these expressions (11) and (12), u0, v0 represent the coordinates of the position (referred to below as an optical axis intersection point) on the light receiving surface of the imaging device at which the optical axis of the lens intersects with the light receiving surface. Accordingly, when the optical axis intersection point is located at the origin (for example, the center of the light receiving surface) of the light receiving surface, u0 is 0 and v0 is 0.

As described above, the focal length f, the coordinates (u0, v0) of the optical axis intersection point, and the correction coefficients k1, k2, k3, p1, and p2 corresponding to strain components caused by the lens need to be known to calculate the coordinates (u, v) of the projected image used in expressions (5) to (8). Accordingly, in the three-dimensional coordinate measuring device 1 according to the embodiment, predetermined values represented by the above symbols f, u0, v0, k1, k2, k3, p1, and p2 are stored in the main body memory 303 as camera parameters.

By the way, in the reference camera 110, the lens may deform or the positional relationship between the lens and the imaging device may deviate due to temperature changes in the installation space, years of use, and the like. In this case, the appropriate values of the camera parameters of the reference camera 110 change with deformation of the lens and changes in the positional relationship between the lens and the imaging device.

As described above, the reference member 190 is preferably disposed so that most of the plurality of markers ep are distributed within the entire imaging visual field of the reference camera 110. Position/posture information can be calculated at higher accuracy by using reference image data indicating an image in which more markers ep are distributed in a wider range of the imaging visual field of the reference camera 110. However, of the reference image data, the data of the part corresponding to the region other than the center part of the imaging visual field is easily affected by the above camera parameters.

Accordingly, the three-dimensional coordinate measuring device 1 according to the embodiment has a calibration function for the reference camera 110, which calibrates the camera parameters stored in the main body memory 303 in the past to new camera parameters that are appropriate at present.

So-called Zhang's method (see Zhang "A flexible new technique for camera calibration", IEEE Transactions on Pattern Analysis and Machine Intelligence, Vol. 22, No. 11, pp. 1330 to 1334, 2000) is known as a camera calibration method. In the calibration function in this example, the reference camera 110 is calibrated by Zhang's method. This calibration method will be described in detail.

If the actual coordinates of the projected image of one marker ep on the light receiving surface are assumed to be (u', v'), the error ex and ey between the coordinates and the above coordinates (u, v) can be represented by the following expressions (13) and (14).

$$ex=u-u' \quad (13)$$

$$ey=v-v' \quad (14)$$

When the reference camera 110 is calibrated, the supporting member 30 and the movable member 40 rotate successively with predetermined pitches, respectively. Accordingly, the reference member 190 shifts to a plurality of different position/posture states. Specifically, the supporting member 30 successively rotates about the optical axis 110c with a pitch of, for example, 30 degrees and the movable member 40 successively rotates about the rotational axis 30c with a pitch of, for example, 10 degrees.

In addition, the plurality of markers ep is captured by the reference camera 110 in each of the plurality of position/posture states. Based on the image data acquired by this capturing, the coordinates of the plurality of projected images of the plurality of markers ep are acquired as the coordinates (u', v') described above.

The positional relationship of the plurality of markers ep is stored as reference marker information in the main body memory 303. Accordingly, the values of x, y, and z above are known values that can be derived based on the positional relationship with respect to the first and second markers ep1 and ep2 by using the reference marker information.

Therefore, the new values (values represented by symbols f, u0, v0, k1, k2, k3, p1, and p2) of the camera parameters that are uniquely defined for all image data are determined so that the integrated value of all error ex and ey acquired for the plurality of markers ep is minimized in the plurality of position/posture states of the reference member 190. At this time, the integrated values of the error ex and ey corresponding to the determined camera parameters are stored in the main body memory 303.

After that, the camera parameters stored in the main body memory 303 before calibration are updated to the new camera parameters determined as described above. Accordingly, even when the temperature environment around the three-dimensional coordinate measuring device 1 changes or the three-dimensional coordinate measuring device 1 is used for a long time, reduction in the calculation accuracy of position/posture information is prevented.

It should be noted here that the initial camera parameters of the three-dimensional coordinate measuring device 1 are determined by the calibration function described above when the three-dimensional coordinate measuring device is first used before shipment from the factory or after shipment from the factory. The camera parameters determined at this time are stored in the main body memory 303.

[6] Calibration Deciding Function

The three-dimensional coordinate measuring device 1 according to the embodiment further includes a calibration deciding function that decides the necessity of the calibration of the reference camera 110 and presents the decision result to the user U.

A calibration decision is performed based on whether the relationship between the positions of the projected images on the light receiving surface of the plurality of markers ep calculated based on the reference marker information and the camera parameters stored in the main body memory 303 and the actual positions of the projected images on the light receiving surface of the plurality of markers ep detected based on the reference image data meets a predetermined permissible condition.

An example of a specific calibration decision will be described. For example, as in calibration, the supporting member 30 and the movable member 40 first rotate successively with predetermined pitches, respectively, the reference member 190 shifts to the plurality of states in which the posture thereof are different, and the reference image data corresponding to each of the states is acquired. Then, the integrated value (referred to below as the decision time integrated error) of all of error ex and ey acquired for the plurality of markers ep in the plurality of states of the reference member 190 is obtained using the reference marker information, the camera parameters, and the plurality of pieces of reference image data.

After that, a decision is made as to whether the ratio of the decision time integrated error to the integrated value (referred to below as the calibration time integrated error) of the error ex and ey calculated in the calibration performed immediately before is equal to or more than a permissible ratio (for example, 1.5) predetermined as a permissible condition. This permissible condition is stored in, for example, the main body memory 303 in advance.

Accordingly, when this ratio is equal to or more than the permissible ratio, a message stating that the reference camera 110 should be calibrated appears in the main body display unit 310 as the decision result. In contrast, when this ratio is less than the permissible ratio, a message stating that the reference camera 110 does not have to be calibrated appears in the main body display unit 310 as the decision result.

It should be noted here that calibration decision is not limited to the above example and may be performed by deciding whether, for example, the decision time integrated error is equal to or more than the threshold predetermined as the permissible condition. In this case, when the decision time integrated error is equal to or more than the predetermined threshold, it is decided that the reference camera 110 should be calibrated. In contrast, when the decision time integrated error is less than the predetermined threshold, it is decided that the reference camera 110 does not have to be calibrated.

[7] Example of Measurement

The probe operation unit 221 in FIG. 9 is depressed by the user U to calculate the coordinates of a measurement point. For example, the user U depresses the probe operation unit 221 in the state in which the contact part 211a makes contact with a desired portion of the measurement target S. In this case, the coordinates of the portion of the measurement target S in contact with the contact part 211a are calculated as the coordinates of the measurement point. The calculated coordinates of the measurement point are stored in the main body memory 303 as the measurement result and displayed on the probe display unit 231 and the main body display unit 310.

In the three-dimensional coordinate measuring device 1, the user U can set desired measurement conditions for the measurement target S by operating the main body operation unit 320 in FIG. 2 or the touch panel display 230 in FIG. 8.

Specifically, the user U selects the geometric element and the measurement item of the measurement target S. The geometric element represents the geometric shape of the portion of the measurement target S to be measured. The geometric shape is a point, a straight line, a plane, a circle, a cylinder, a sphere, or the like. In addition, the measurement item represents the type of a physical quantity of the measurement target S to be measured, such as a distance, an angle, or flatness.

After selecting the geometric element and the measurement item, the user U specifies one or more measurement points of the selected geometric element using the probe 200. This generates information (referred to below as element specifying information) indicating the selected geometric element specified by one or more measurement points on the measurement target S in a world coordinate system. After that, the value of the measurement item selected for the generated element specifying information is calculated.

For example, when the user U wants to measure the distance between a first surface and a second surface (of the measurement target S) that are parallel with each other and positioned opposite to each other, the user U selects geometric elements "plane 1" and "plane 2". In addition, the user U selects a measurement item "distance".

In this case, to specify the plane (first surface) on the measurement target S corresponding to the geometric element "plane 1", the user U specifies a plurality of points (three or more points in this example) on the first surface of the measurement target S as measurement points using the probe 200. This generates the element specifying information corresponding to the geometric element "plane 1".

In addition, to specify the plane (second surface) on the measurement target S corresponding to the geometric element "plane 2", the user U specifies a plurality of points (three or more points in this example) on the second surface of the measurement target S as measurement points using the probe 200. This generates the element specifying information corresponding to the geometric element "plane 2".

After that, the distance between the first surface and the second surface of the measurement target S that corresponds to a measurement item "distance" is calculated based on two pieces of element specifying information that correspond to "plane 1" and "plane 2", respectively.

The calculated measurement result is stored in the main body memory 303 and displayed in the probe display unit 231 and the main body display unit 310.

[8] Functional Structure of the Main Body Control Circuit 302

Figure 10:
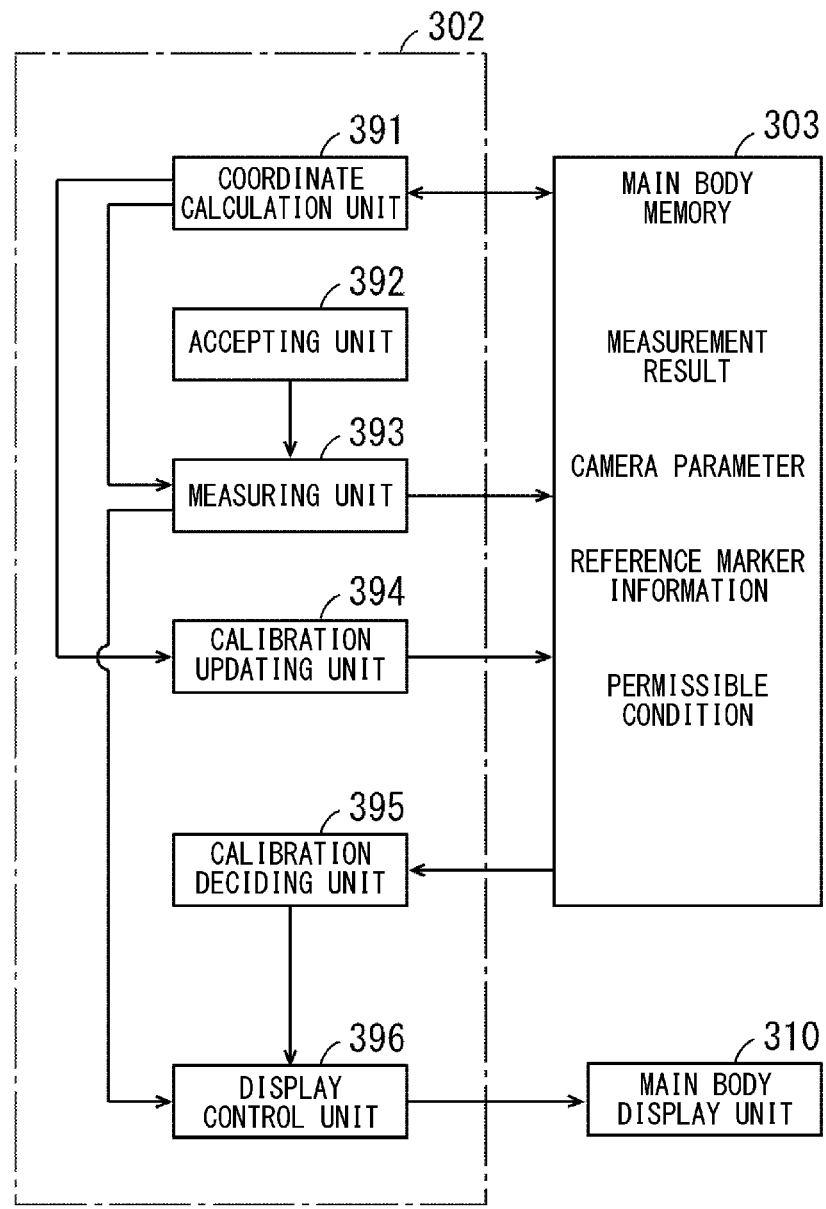
FIG. 10 is a block diagram illustrating the functional structure of a main body control circuit.

FIG. 10 is a block diagram illustrating the functional structure of the main body control circuit 302. As illustrated in FIG. 10, the main body control circuit 302 includes a coordinate calculation unit 391, an accepting unit 392, a measuring unit 393, a calibration updating unit 394, a calibration deciding unit 395, and a display control unit 396. These functional units are achieved by causing the CPU of the main body control circuit 302 to execute a measurement processing program, a calibration program, a calibration decision program, and the like stored in the main body memory 303. It should be noted here that a part or all of the plurality of functional units described above may be achieved by hardware such as electronic circuits.

The coordinate calculation unit 391 generates position/posture information indicating the position and the posture of the movable camera 120 with respect to the reference camera 110 based on the reference image data and the reference marker information and camera parameters stored in the main body memory 303 when the shape of the measurement target S is measured. In addition, the coordinate calculation unit 391 calculates the coordinates of a measurement point on the measurement target S based on the generated position/posture information and the measurement image data.

The accepting unit 392 accepts the geometric element and the measurement item selected by the user U from the plurality of predetermined geometric elements and the plurality of predetermined measurement items. The measuring unit 393 calculates the value of the selected measurement item concerning the selected geometric element specified by the measurement point in the measurement target S based on the geometric element and the measurement item accepted by the accepting unit 392 and the coordinates of the measurement point calculated by the coordinate calculation unit 391. In addition, the measuring unit 393 stores the calculated value in the main body memory 303 as the measurement result.

In the calibration of the reference camera 110, the calibration updating unit 394 rotates the movable member 40 about at least one of the optical axis 110c and the rotational axis 30c. This rotates the movable camera 120 and the reference member 190 together with the movable member 40. This causes the calibration updating unit 394 to capture the plurality of markers ep of the reference member 190 via the reference camera 110 in a plurality of states in which the posture thereof are different while shifting the movable camera 120 in the plurality of states. In addition, the calibration updating unit 394 calculates new camera parameters based on the plurality of pieces of reference image data and the reference marker information acquired by this capturing. Furthermore, the calibration updating unit 394 updates the camera parameters stored in the main body memory 303 before calibration to the calculated new camera parameters.

The calibration deciding unit 395 calculates the positions of the projected images of the plurality of markers ep on the light receiving surface of the reference camera 110 based on the reference marker information and the camera parameters stored in the main body memory 303. In addition, the calibration deciding unit 395 detects the actual positions of the projected images of the plurality of markers ep on the light receiving surface based on the reference image data obtained by capturing the plurality of markers ep via the reference camera 110. After that, the calibration deciding unit 395 decides the necessity of calibration based on whether the relationship between the calculated positions of the projected images and the detected actual positions of the projected images meets a predetermined permissible condition and outputs a decision result. The display control unit 396 displays the decision result output from the calibration deciding unit 395 in the main body display unit 310.

[9] Measurement Processing

Figure 11:
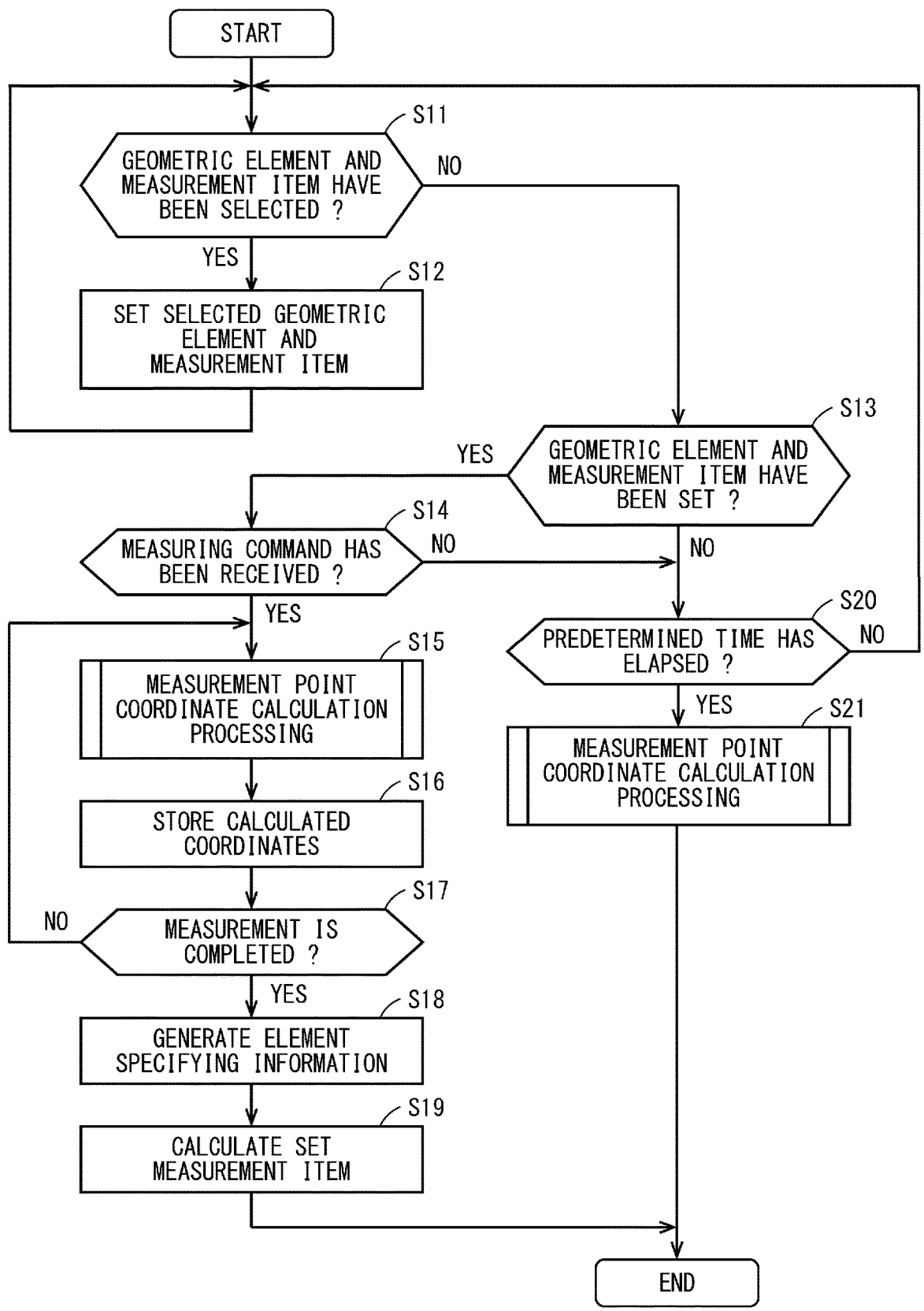
FIG. 11 is a flowchart illustrating a flow of measurement processing by the main body control circuit in FIG. 2.

FIG. 11 is a flowchart illustrating a flow of measurement processing by the main body control circuit 302 in FIG. 2. The measurement processing in FIG. 11 is repeated at a predetermined period by causing the CPU of the main body control circuit 302 in FIG. 2 to execute the measurement processing program stored in the main body memory 303. In addition, at the start of the measurement processing, the timer included in the main control circuit 302 is reset and then started.

First, the accepting unit 392 of the main control circuit 302 decides whether the geometric element and the measurement item have been selected based on the presence or absence of the operation of the main body operation unit 320 in FIG. 2 or the touch panel display 230 in FIG. 8 by the user U (step S11).

When the geometric element and the measurement item have been selected, the accepting unit 392 of the main body control circuit 302 sets the selected geometric element and the measurement item as the measurement conditions by storing the geometric element and the measurement item in the main body memory 303 in FIG. 2 (step S12). After that, the accepting unit 392 of the main body control circuit 302 returns to the processing in step S11.

When the geometric element and the measurement item have not been selected in step S11, the measuring unit 393 of the main body control circuit 302 decides whether the geometric element and the measurement item have been set (step S13). When the geometric element and the measurement item have been set, the measuring unit 393 of the main body control circuit 302 decides whether a command to start the measurement of the measurement target S has been received (step S14). This decision is performed based on, for example, the presence or absence of an operation of the main body operation unit 320 or the touch panel display 230 by the user U.

When the command to start the measurement of the measurement target S has been received, the coordinate calculation unit 391 of the main body control circuit 302 performs measurement point coordinate calculation processing (step S15). Details on the measurement point coordinate calculation processing will be described later. This processing causes the coordinate calculation unit 391 of the main body control circuit 302 to calculate the coordinates of the measurement points that specify the selected geometric element based on an operation of the probe 200 by the user U.

The coordinate calculation unit 391 of the main body control circuit 302 stores, in the main body memory 303, the coordinates of one or more measurement points calculated by the measurement point coordinate calculation processing in step S15 (step S16).

Next, the measuring unit 393 of the main body control circuit 302 decides whether a command to end the measurement of the measurement target S has been received (step S17). This decision is performed based on, for example, the presence or absence of the operation of the main body operation unit 320 or the touch panel display 230 by the user U.

When the command to end the measurement has not been received, the coordinate calculation unit 391 of the main body control circuit 302 returns to the processing in step S15 described above. In contrast, when the command to end the measurement has been received, the measuring unit 393 of the main body control circuit 302 generates the element specifying information for the geometric element set from the coordinates of one or more measurement points stored in the main body memory 303 in the processing in step S16 immediately before (Step S18).

After that, the measuring unit 393 of the main body control circuit 302 calculates the value of the measurement item set based on the element specifying information generated in the processing in step S18 (step S19) and ends the measurement processing. When a plurality of geometric elements (for example, two planes or the like) is set in the decision in step S13, the processing in steps S14 to S18 described above is performed for each of the set geometric elements.

When the geometric element and the measurement item have not been set in step S13 and when the command to start the measurement of the measurement target S has not been received in step S14, the measuring unit 393 of the main body control circuit 302 decides whether a predetermined time has elapsed after the start of the measurement processing based on the measurement time by the built-in timer (step S20).

When the predetermined time has not elapsed, the accepting unit 392 of the main body control circuit 302 returns to the processing in step S11. In contrast, when the predetermined time has elapsed, the coordinate calculation unit 391 of the main body control circuit 302 performs the measurement point coordinate calculation processing described later as in the processing in step S15 (step S21). After that, the coordinate calculation unit 391 of the main body control circuit 302 ends the measurement processing.

It should be noted here that the processing in step S21 is performed, for example, to decide whether the probe 200 is present within the imaging visual field of the movable camera 120 or the bird's eye view camera 180 in tracking processing, which will be described later.

Figure 12:
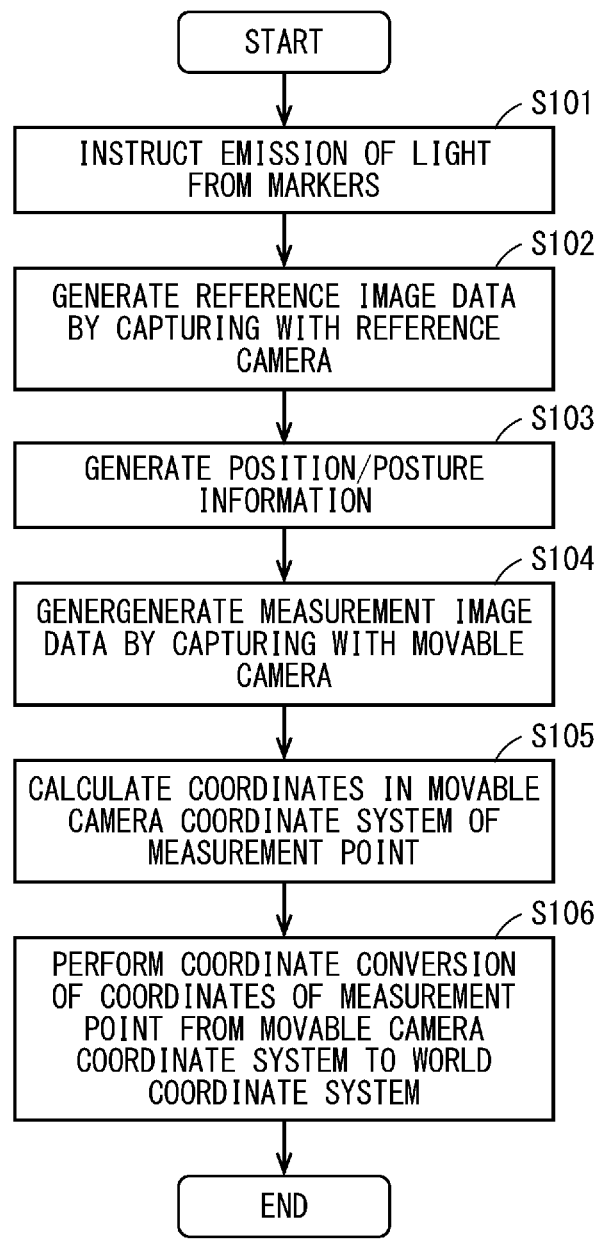
FIG. 12 is a flowchart illustrating a flow of measurement point coordinate calculation processing.

FIG. 12 is a flowchart illustrating a flow of measurement point coordinate calculation processing. First, the coordinate calculation unit 391 instructs the probe control unit 201 of the probe 200 to emit light from the plurality of markers eq (FIG. 9) and instructs the head control circuit 150 of the imaging head 100 to emit light from the plurality of markers ep (FIG. 6B) of the reference member 190 (step S101).

Next, the coordinate calculation unit 391 generates reference image data by causing the head control circuit 150 to capture the plurality of markers ep of the reference member 190 using the reference camera 110 (step S102). In addition, the coordinate calculation unit 391 calculates the position/posture information indicating the position and the posture of the movable camera 120 based on the generated reference image data and the reference marker information and the camera parameters stored in the main body memory 303 (step S103).

Next, the coordinate calculation unit 391 generates measurement image data by capturing the plurality of markers eq of the probe 200 using the movable camera 120 (step S104). In addition, the coordinate calculation unit 391 calculates the coordinates in the movable camera coordinate system of the measurement point on the measurement target S based on the generated measurement image data (step S105).

After that, the coordinate calculation unit 391 performs coordinate conversion of the coordinates calculated in step S105 from the coordinates in the movable camera coordinate system to the coordinates in the world coordinate system based on the calculated position/posture information (step S106). This ends the measurement point coordinate calculation processing.

It should be noted here that the processing in step S102 and step S103 described above and the processing in step S104 and step S105 may be performed in the reverse order.

According to the measurement processing described above, the user U can easily measure a desired physical quantity of the measurement target S by selecting a desired geometric element and a desired measurement item from the plurality of predetermined geometric elements and the plurality of predetermined measurement items.

[10] Tracking Processing

Figure 13:
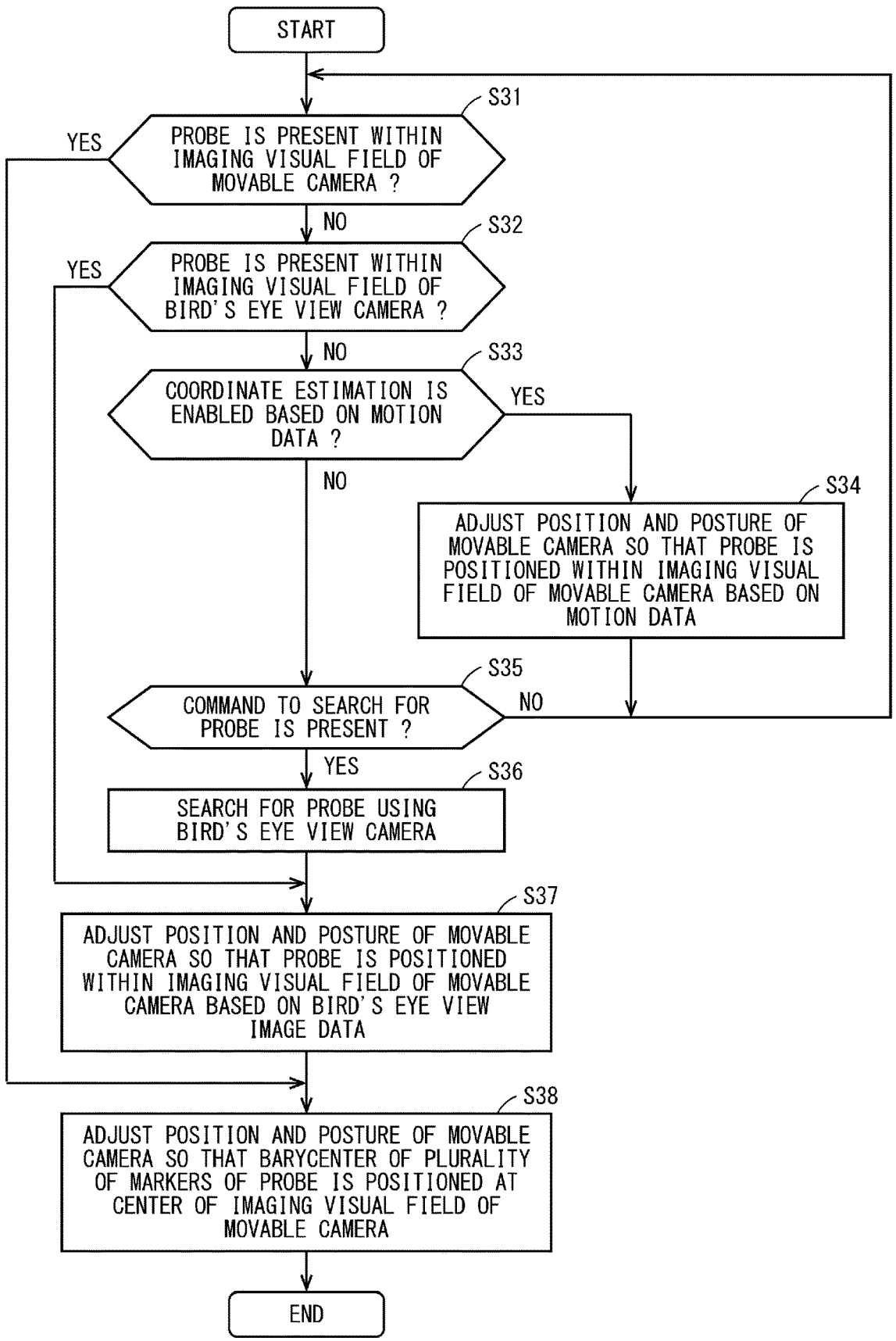
FIG. 13 is a flowchart illustrating a flow of tracking processing by the main body control circuit in FIG. 2.

FIG. 13 is a flowchart illustrating a flow of tracking processing by the main body control circuit 302 in FIG. 2. The tracking processing in FIG. 13 is repeated at a predetermined period by causing the CPU of the main body control circuit 302 in FIG. 2 to execute the tracking processing program stored in the main body memory 303.

First, the main body control circuit 302 decides whether the probe 200 is present within the imaging visual field of the movable camera 120 (step S31). This decision is performed by deciding whether the measurement image data generated during the processing in step S15 and step S21 in the measurement processing includes the image data corresponding to the plurality of markers eq.

When the probe 200 is present within the imaging visual field of the movable camera 120, the main body control circuit 302 proceeds to the processing in step S38, which will be described later. In contrast, when the probe 200 is not present in the imaging visual field of the movable camera 120, the main body control circuit 302 decides whether the probe 200 is in the imaging visual field of the bird's eye view camera 180 (step S32). This decision is performed by deciding whether the bird's eye view image data generated during the processing in step S15 and step S21 in the measurement processing described above includes the image data corresponding to the plurality of markers eq.

When the probe 200 is present within the imaging visual field of the bird's eye view camera 180, the main body control circuit 302 proceeds to the processing in step S37, which will be described later. In contrast, when the probe 200 is not present within the imaging visual field of the movable camera 120, the main body control circuit 302 decides whether the coordinate estimation of the probe 200 is enabled based on the motion data transferred from the probe 200 (step S33). This decision is performed based on, for example, whether the motion data indicates an abnormal value or whether the value indicated by the motion data is zero. When the motion data indicates an abnormal value or when the motion data is zero, the coordinate estimation of the probe 200 is enabled.

When the coordinate estimation of the probe 200 is enabled, the main body control circuit 302 estimates the position of the probe 200 based on the motion data. In addition, the main body control circuit 302 instructs the adjustment of the position and the posture of the movable camera 120 so that the probe 200 is positioned within the imaging visual field of the movable camera 120 (step S34). After that, the main body control circuit 302 returns to the processing in step S31.

Here, the user U can instruct the main body control circuit 302 to search for the probe 200 by operating the main body operation unit 320 in FIG. 2 or the touch panel display 230 in FIG. 8.

When the coordinate estimation of the probe 200 is disabled in step S33, the main body control circuit 302 decides whether a command to search for the probe 200 has been received (step S35). When the command to search for the probe 200 has not been received, the main body control circuit 302 returns to the processing in step S31. In contrast, when the command to search for the probe 200 has been received, the main body control circuit 302 instructs the head control circuit 150 to rotate the supporting member 30 of the imaging head 100. In this way, the main body control circuit 302 searches for the probe 200 using the bird's eye view camera 180 (step S36).

After that, when the probe 200 is positioned within the imaging visual field of the bird's eye view camera 180, the main body control circuit 302 calculates the position of the probe 200 based on the bird's eye view image data. In addition, the main body control circuit 302 instructs the head control circuit 150 to adjust the position and the posture of the movable camera 120 so that the probe 200 is positioned within the imaging visual field of the movable camera 120 (step S37).

Next, when the probe 200 is positioned within the imaging visual field of the movable camera 120, the main body control circuit 302 instructs the head control circuit 150 to adjust the position and the posture of the movable camera 120 so that the barycenter of the plurality of markers eq of the probe 200 is positioned at the center of the imaging visual field of the movable camera 120 (step S38). After that, the main body control circuit 302 ends the tracking processing.

According to the tracking process described above, even when the probe 200 moves, the imaging visual field of the movable camera 120 follows the plurality of markers eq of the probe 200. Therefore, the user U does not need to manually adjust the imaging visual field of the movable camera 120. Accordingly, the coordinates of a desired measurement point of the measurement target S can be measured over a wide range without the need for a complicated adjustment operation.

[11] Calibration Processing

Figure 14:
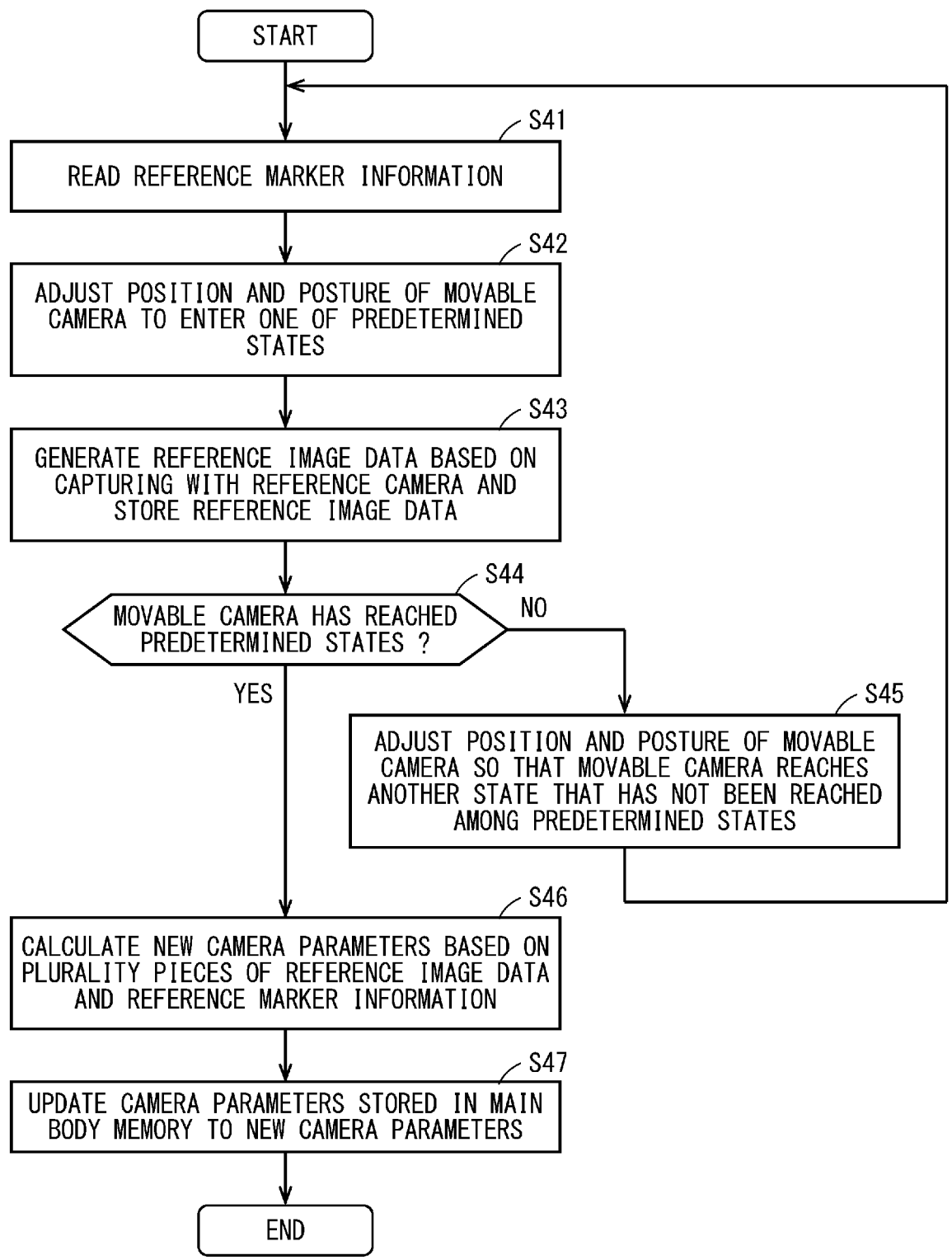
FIG. 14 is a flowchart illustrating a flow of calibration processing by the main body control circuit in FIG. 2.

FIG. 14 is a flowchart illustrating a flow of calibration processing by the main body control circuit 302 in FIG. 2. The calibration processing in FIG. 14 is achieved when the CPU of the main body control circuit 302 in FIG. 2 executes the calibration program stored in the main body memory 303 and is started in response to an instruction for calibration processing provided when the user U operates the main body operation unit 320 in FIG. 2.

When calibration processing is started, the calibration updating unit 394 of the main body control circuit 302 reads the reference marker information stored in the main body memory 303 in advance (step S41).

Next, the calibration updating unit 394 instructs the imaging head 100 to adjust the posture of the movable camera 120 so that the movable camera 120 enters one of the plurality of predetermined states (step S42). This adjusts the posture of the movable camera 120 so that the posture enter one state by causing a rotation driving circuit 140 to drive at least one of a horizontal rotation mechanism 141 and a tilt rotation mechanism 143 in FIG. 4, in the imaging head 100.

Next, the calibration updating unit 394 generates reference image data by causing the reference camera 110 to capture the plurality of markers ep of the reference member 190 and stores this reference image data in the main body memory 303 (step S43).

Next, the calibration updating unit 394 decides whether the movable camera 120 has reached all of the plurality of predetermined states after the calibration processing currently in progress is started (step S44).

When the movable camera 120 has not reached all of the plurality of predetermined states in step S44, the calibration updating unit 394 instructs the imaging head 100 to adjust the posture of the movable camera 120 so that the movable camera 120 reaches another state that has not been reached among the plurality of predetermined states (step S45). This adjusts the posture of the movable camera 120 to another state by causing the rotation driving circuit 140 to drive at least one of the horizontal rotation mechanism 141 and the tilt rotation mechanism 143 in FIG. 4 in the imaging head 100. After that, the calibration updating unit 394 returns to the processing in step S41.

When the movable camera 120 has reached all of the plurality of predetermined states in step S44, the calibration updating unit 394 calculates new camera parameters based on the plurality of pieces of reference image data and the reference marker information stored in the main body memory 303 in the processing in step S43 (step S46).

After that, the calibration updating unit 394 updates the camera parameters stored in the main body memory 303 to the calculated new camera parameters (step S47). This ends the calibration processing.

In the example described above, the calibration processing is started in response to a start instruction for the calibration processing issued when the user U operates the main body operation unit 320. The calibration processing is not limited to this example and may be started automatically in response to, for example, power-on of the three-dimensional coordinate measuring device 1. Alternatively, the calibration processing may be started automatically when, for example, a temperature detector monitors the temperature around the three-dimensional coordinate measuring device 1 and the detected temperature falls outside a predetermined temperature range. Alternatively, the calibration processing may be performed automatically each time the operation time of the three-dimensional coordinate measuring device 1 elapses a predetermined time.

[12] Calibration Decision Processing

Figure 15:
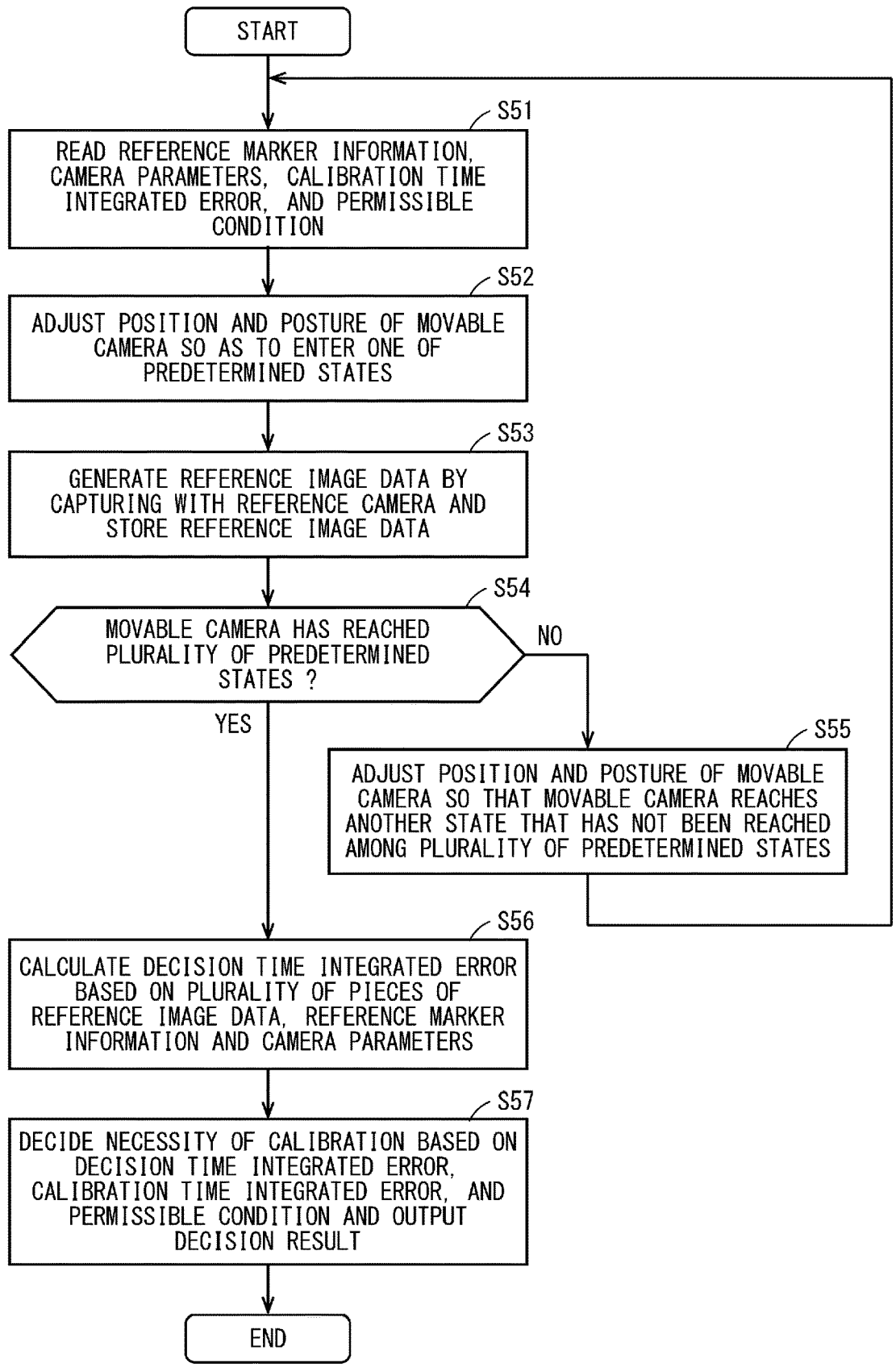
FIG. 15 is a flowchart illustrating a flow of calibration decision processing by the main body control circuit in FIG. 2.

FIG. 15 is a flowchart illustrating a flow of calibration decision processing by the main body control circuit 302 in FIG. 2. The calibration decision processing in FIG. 15 is achieved by causing the CPU of the main body control circuit 302 in FIG. 2 to execute the calibration decision program stored in the main body memory 303 and is started in response to an operation of the main body operation unit 320 in FIG. 2 by the user U. It is assumed that the main body memory 303 stores the calibration time integrated error and the permissible condition in advance in the initial state.

When the calibration decision processing is started, the calibration deciding unit 395 of the main body control circuit 302 reads the reference marker information, the camera parameters, the calibration time integrated error, and the permissible condition stored in the main body memory 303 in advance (step S51).

Next, the calibration deciding unit 395 instructs the imaging head 100 to adjust the posture of the movable camera 120 so that the movable camera 120 enters one of the plurality of predetermined states (step S52). In addition, the calibration deciding unit 395 generates reference image data by causing the head control circuit 150 to capture the plurality of markers ep of the reference member 190 using the reference camera 110 and stores the reference image data in the main body memory 303 (step S53).

Next, the calibration deciding unit 395 decides whether the movable camera 120 has reached all of the plurality of predetermined states after the calibration processing currently in progress is started (step S54).

When the movable camera 120 has not reached all of the plurality of predetermined states in step S54, the calibration deciding unit 395 instructs the imaging head 100 to adjust the posture of the movable camera 120 so that the movable camera 120 reaches another state that has not been reached among the plurality of predetermined states (step S55). After that, the calibration deciding unit 395 returns to the processing in step S51.

When the movable camera 120 has reached all of the plurality of predetermined states in step S54, the calibration deciding unit 395 calculates the decision time integrated error based on the plurality of pieces of reference image data, the reference marker information, and the camera parameters stored in the main body memory 303 in the processing in step S53 (step S56).

After that, the calibration deciding unit 395 decides the necessity of calibration based on the calculated decision time integrated error, the read calibration time integrated error, and the read permissible condition, and outputs the decision result (step S57). This ends the calibration decision processing.

In the example described above, the calibration decision processing is started in response to a start instruction for the calibration decision processing issued when the user U operates the main body operation unit 320. The calibration decision processing is not limited to this example and may be started automatically in response to, for example, power-on of the three-dimensional coordinate measuring device 1. Alternatively, the calibration decision processing may be started automatically when, for example, a temperature detector monitors the temperature around the three-dimensional coordinate measuring device 1 and the detected temperature falls outside a predetermined temperature range. Alternatively, the calibration decision processing may be performed automatically each time the operation time of the three-dimensional coordinate measuring device 1 elapses a predetermined time.

The decision result output by the calibration deciding unit 395 is displayed in the main body display unit 310 in FIG. 2 by the display control unit 396 of the main body control circuit 302. FIG. 16 illustrates a display example of the decision result by the calibration deciding function.

Figure 16A:
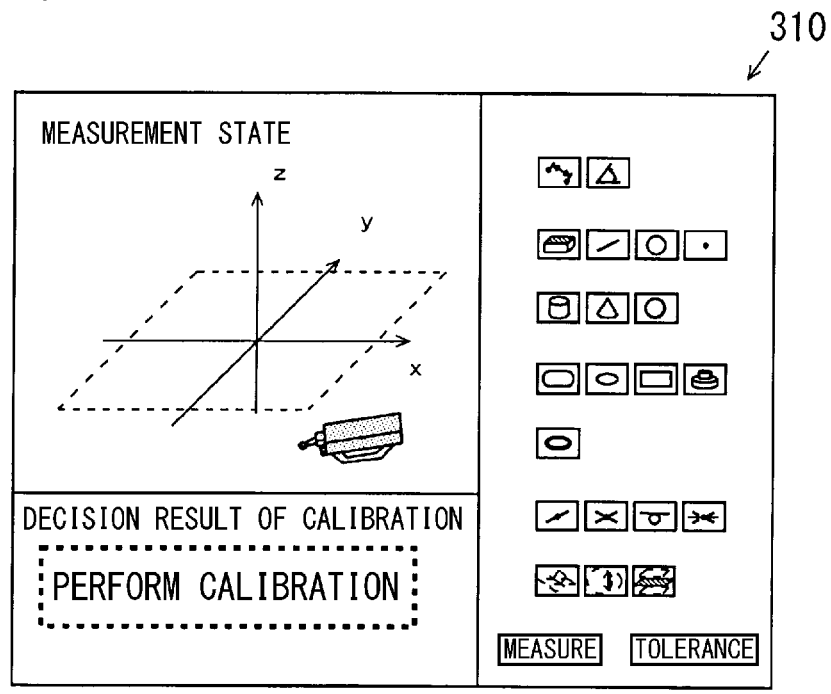
FIGS. 16A and 16B illustrate a display example of a decision result by a calibration deciding function.
Figure 16B:
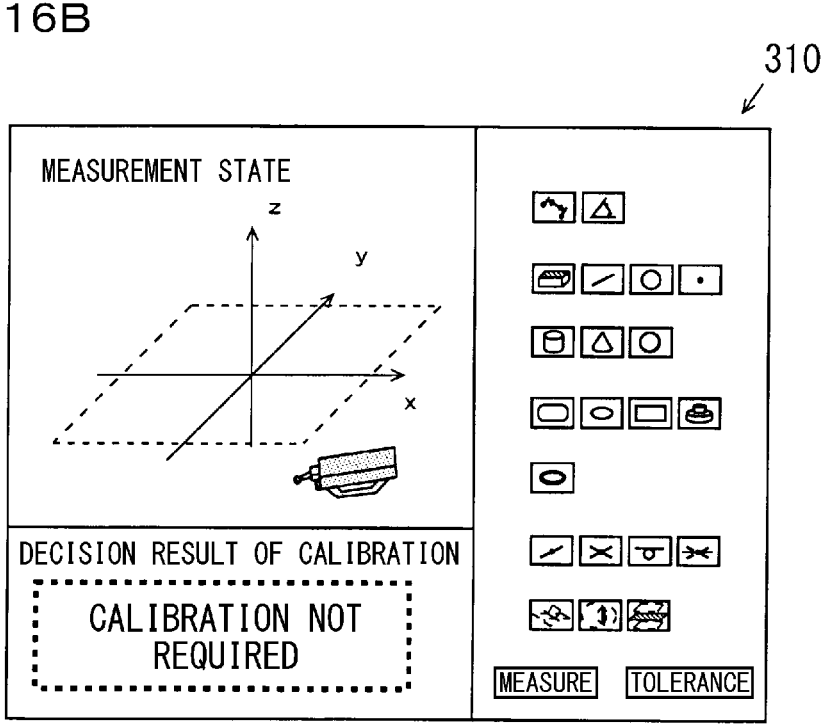

When it is decided that the reference camera 110 should be calibrated as a result of the calibration decision, as illustrated by a thick dotted line in FIG. 16A, a message prompting the user U for a calibration operation is displayed on the screen of the main body display unit 310. In contrast, when it is decided that the reference camera 110 does not have to be calibrated as a result of the calibration decision, as illustrated by a thick dotted line in FIG. 16B, a message stating that the user U does not have to perform a calibration operation is displayed on the screen of the main body display unit 310. This enables the user U to easily grasp the necessity of the calibration of the reference camera 110.

[13] Use Example of the Probe Camera 208

An image of the measurement target S can be displayed in the main body display unit 310 in FIG. 2 by capturing the measurement target S using the probe camera 208 in FIG. 8. An image acquired by the probe camera 208 is referred to below as a captured image.

The positional relationship between the plurality of markers eq of the probe 200 and the probe camera 208 and the characteristics (angle of view, distortion, and the like) of the probe camera 208 are stored in advance as imaging information in, for example, the main body memory 303 in FIG. 2. Therefore, when the plurality of markers eq is present within the imaging visual field of the movable camera 120, the area captured by the probe camera 208 is recognized by the main body control circuit 302 in FIG. 2. That is, the three-dimensional space corresponding to the captured image is recognized by the main body control circuit 302. In this case, it is possible to superimpose the geometric element and the measurement item set at the time of measurement of the measurement target S while displaying the captured image on the main body display unit 310.

It should be noted here that the captured image may be displayed on the touch panel display 230 of the probe 200. For example, the touch panel display 230 displays a captured image obtained by capturing a portion of a certain measurement target S to be measured in advance using the probe camera 208. In this case, the user U can easily identify the portion to be measured of another measurement target S by operating the probe 200 while visually recognizing the captured image.

[14] Effects

In the three-dimensional coordinate measuring device 1 described above, when the shape of the measurement target S is measured, the measurement target S is captured by the movable camera 120 and measurement image data is generated. In addition, the plurality of markers ep of the reference member 190 provided integrally with the movable camera 120 is captured by the reference camera 110 and reference image data is generated. After that, position/posture information is calculated based on the reference image data, the reference marker information, and the camera parameters, and the coordinates in the world coordinate system of measurement point are calculated based on the calculated position/posture information and the measurement image data.

When the reference camera 110 is calibrated, the movable camera 120 shifts to a plurality of states in which the position and posture thereof are different. The plurality of markers ep of the reference member 190 is captured by the reference camera 110 in each of the plurality of states. New camera parameters are calculated based on the plurality of pieces of reference image data and the reference marker information obtained as described above and the camera parameters stored in the main body memory 303 are updated to the new camera parameters. Accordingly, the camera parameters stored in the main body memory 303 are updated to appropriate camera parameters without complicated calibration work by the user U such as preparation of calibration tools.

As a result, highly reliable shape measurement can be performed at high accuracy without complicated calibration work.

[15] Other Embodiments (1) Although each of the plurality of markers ep of the reference member 190 has a planar circular shape in the embodiment described above, the invention is not limited to this example. In the reference member 190, the position and the posture of the movable camera 120 only need to be calculated based on the image data acquired by capturing with the reference camera 110.

The shape of each of the markers ep is not limited to a planar circular shape, and may be a planar polygonal shape, a planar elliptical shape, a planar star shape, or a spherical shape. Alternatively, the reference member 190 may be provided with, for example, a plurality of linear markers formed in a grid, may be provided with annular markers, or may be provided with coded markers.

Although the plurality of markers ep provided on the reference member 190 is arranged in a matrix in the embodiment described above, the plurality of markers ep only needs to be arranged in a distributed manner.

(2) In the embodiment described above, each of the plurality of markers ep of the reference member 190 has a self-emission structure in which the plurality of light emitting elements L releases light by emitting light, but the present invention is not limited to this example. Each of the markers ep may have a retroreflective structure. In this case, when the reference camera 110 captures the plurality of markers ep, the markers ep need to be irradiated with light.

(3) In the embodiment described above, the movable camera 120 with a cyclopean eye is used as a movable imaging unit for capturing the probe 200, but the invention is not limited to this example. A compound eye camera may be used as the movable imaging unit.

(4) In the embodiment described above, the reference camera 110 with a cyclopean eye is used as the reference imaging unit for capturing the plurality of markers ep of the reference member 190, but the invention is not limited to this example. A compound eye camera may be used as the reference imaging unit.

(5) In the embodiment described above, the reference camera 110 is provided so that the optical axis 110c thereof is orthogonal to the upper surface of the fixing section 11 of the reference stand 10, but the invention is not limited to this example. The reference camera 110 may be provided so that the optical axis 110c thereof is inclined with respect to the upper surface of the fixing section 11 of the reference stand 10.

(6) In the three-dimensional coordinate measuring device 1 according to the embodiment described above, the movable camera 120 is configured so that the imaging visual field thereof can be moved vertically by the tilt rotation mechanism 143, but the present invention is not limited to this example. The tilt rotation mechanism 143 does not need to be provided. In this case, the imaging visual field of the movable camera 120 rotates only in the horizontal direction about the optical axis 110c of the reference camera 110.

(7) In the three-dimensional coordinate measuring device 1 according to the embodiment described above, the imaging visual field of the movable camera 120 can be rotated horizontally about the optical axis 110c of the reference camera 110 by the horizontal rotation mechanism 141, but the invention is not limited to this example. The horizontal rotation mechanism 141 does not need to be provided. In this case, the imaging visual field of the movable camera 120 moves only vertically.

(8) The movable camera 120 may be provided movably within the horizontal plane above the reference camera 110.

(9) In the three-dimensional coordinate measuring device according to the embodiment described above, the movable camera 120 is attached to the movable member 40 so that the posture thereof can be changed with respect to the reference stand 10 and the reference camera 110, but the invention is not limited to this example. The movable camera 120 may be provided so as to have the position and the posture fixed to the reference camera 110. An example of the structure in which the movable camera 120 is provided so as to have the position and the posture fixed to the reference camera 110 will be described below.

Figure 17:
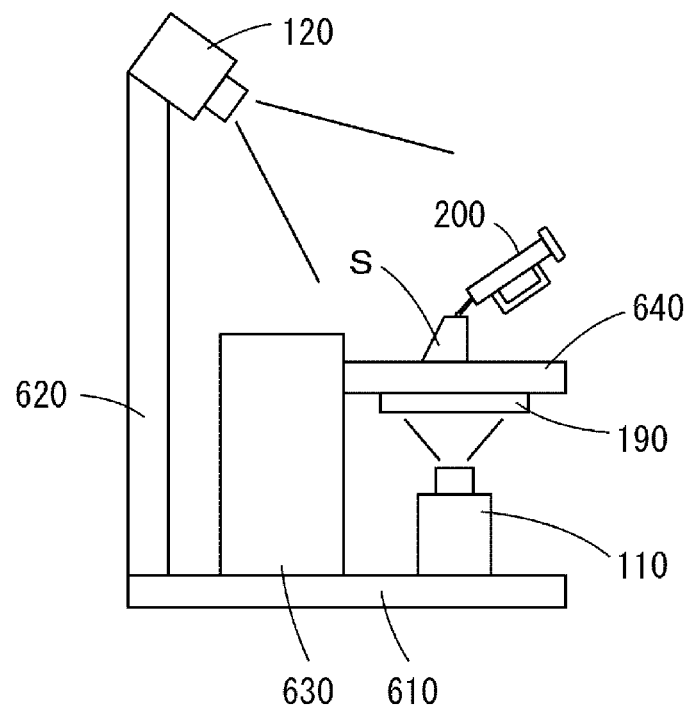
FIG. 17 illustrates an example of the structure of a three-dimensional coordinate measuring device according to another embodiment.

FIG. 17 illustrates an example of the structure of a three-dimensional coordinate measuring device according to another embodiment. FIG. 17 illustrates the structure of the three-dimensional coordinate measuring device from which the processing device 300, the main body display unit 310, and the main body operation unit 320 in FIG. 1 have been removed.

In the three-dimensional coordinate measuring device in FIG. 17, the reference camera 110, a stand member 620, and a stage support device 630 are provided on a planar base member 610. The stand member 620 is fixed to a part of the upper surface of the base member 610 so as to extend upward. The movable camera 120 is fixed to the upper end portion of the stand member 620 so that the imaging visual field faces obliquely downward.

The stage support device 630 is fixed to the base member 610 and supports a rotational transfer stage 640 on which the measurement target S is placed so that the rotational transfer stage 640 can move horizontally, rotate within the horizontal plane, incline with respect to the horizontal plane, and move vertically. In addition, the stage support device 630 can change the position and the posture of the rotational transfer stage 640 in response to an instruction from the processing device 300.

The rotational transfer stage 640 is supported so that the space above the rotational transfer stage 640 is located within the imaging visual field of the movable camera 120. This enables the movable camera 120 to capture the measurement target S in the state in which the measurement target S is placed on the rotational transfer stage 640.

The lower surface of the rotational transfer stage 640 is provided with the reference member 190 according to the embodiment described above. The reference camera 110 is fixed to the base member 610 so that the imaging visual field faces upward and the plurality of markers ep of the reference member 190 is located within the imaging visual field of the reference camera 110.

In the three-dimensional coordinate measuring device 1 having the structure described above, the measurement point on the measurement target S is instructed by the probe 200 in the state in which the measurement target S is placed on the rotational transfer stage 640. In this case, the coordinates in the movable camera coordinate system of the instructed measurement point can be calculated by causing the movable camera 120 to capture the plurality of markers eq of the probe 200.

Information (position/posture information) indicating the position and the posture of the rotational transfer stage 640 with respect to the movable camera 120 and the reference camera 110 can be calculated based on reference image data acquired by causing the reference camera 110 to capture the reference member 190. Accordingly, when the position and the posture of the rotational transfer stage 640 are changed, the coordinates of the measurement point in the coordinate system relative to the rotational transfer stage 640 can be calculated based on the coordinates in the movable camera coordinate system of the measurement point and the position/posture information calculated after this change. This enables the entire shape of the measurement target S to be grasped while changing the position and the posture of the measurement target S with respect to the movable camera 120.

(10) Although the coordinates of the measurement point on the measurement target S are calculated based on measurement image data acquired by causing the movable camera 120 to capture the probe 200 in the three-dimensional coordinate measuring device 1 according to the embodiment described above, the invention is not limited to this example.

The coordinates of the measurement point on the measurement target S may be calculated by another position detection section in place of the movable camera 120 and the probe 200 described above.

Figure 18:
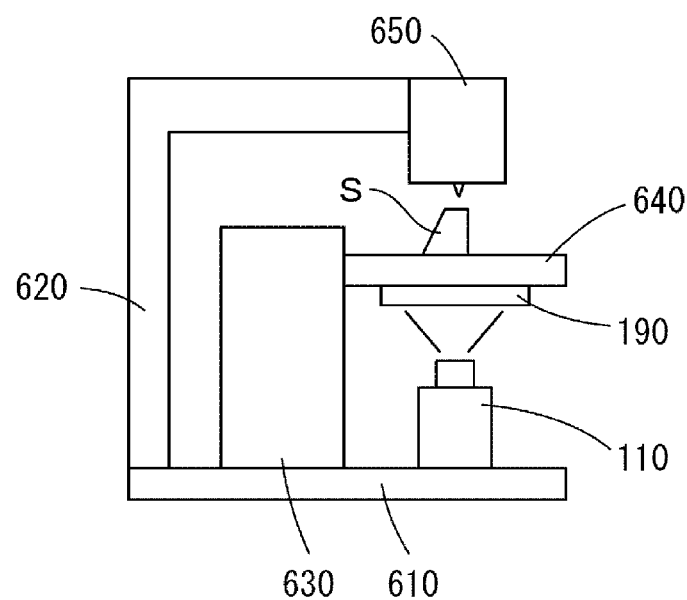
FIG. 18 illustrates another example of the structure of the three-dimensional coordinate measuring device according to the other embodiment.

FIG. 18 illustrates another example of the structure of the three-dimensional coordinate measuring device according to the other embodiment. FIG. 18 illustrates the structure of the three-dimensional coordinate measuring device from which the processing device 300, the main body display unit 310, and the main body operation unit 320 in FIG. 1 have been removed, as in the example in FIG. 17.

As illustrated in FIG. 18, the three-dimensional coordinate measuring device in this example is different from the three-dimensional coordinate measuring device in FIG. 17 in that a measurement point coordinate acquisition device 650 is provided in place of the movable camera 120 and the probe 200.

It is assumed that a three-dimensional coordinate system (referred to below as a sub-coordinate system) having a predetermined relationship with respect to the measurement point coordinate acquisition device 650 is defined in this example.

The measurement point coordinate acquisition device 650 is provided above the rotational transfer stage 640 by the stand member 620 so as to be able to calculate the coordinates in the sub-coordinate system of the measurement point on the measurement target S. In this case, the measurement point coordinate acquisition device 650 may include, for example, an in-depth probe used for a scanning-type probe microscope and a three-dimensional scanning element for scanning the in-depth probe or may include an optical probe used for shape measurement and a three-dimensional scanning element for scanning the optical probe.

In the three-dimensional coordinate measuring device having the structure described above, the coordinates in the sub-coordinate system of the measurement point on the measurement target S are calculated using the measurement point coordinate acquisition device 650 in the state in which the measurement target S is placed on the rotational transfer stage 640. In addition, the position/posture information of the rotational transfer stage 640 is calculated by causing the reference camera 110 to capture the reference member 190. Accordingly, when the position and the posture of the rotational transfer stage 640 are changed, the coordinates of the measurement point in the coordinate system relative to the rotational transfer stage 640 can be calculated based on the coordinates in the sub-coordinate system of the measurement point and the position/posture information calculated after this change. This enables the entire shape of the measurement target S to be grasped while changing the position and the posture of the measurement target S with respect to the measurement point coordinate acquisition device 650.

[16] Correspondence Between Components in Claims and Units in the Embodiment

An example of the correspondence between the components in claims and units in the embodiment will be described below, but the invention is not limited to the following example.

In the embodiment described above, the movable camera 120 and the measurement point coordinate acquisition device 650 are examples of the measurement point information acquisition unit, the movable member 40 and the reference member 190 are examples of the motorized rotation member, the plurality of markers ep of the reference member 190 is an example of the plurality of reference markers, the reference camera 110 is an example of the reference imaging unit, and the imaging parameter is an example of the camera parameter.

In addition, the main body memory 303 is an example of the storage unit, the coordinate calculation unit 391 is an example of the coordinate calculation unit, the calibration updating unit 394 is an example of the calibration updating unit, the calibration deciding unit 395 is an example of the calibration deciding unit, and the main body display unit 310 is an example of the presentation unit.

In addition, the probe 200 is an example of the probe, the plurality of markers eq of the probe 200 is an example of the plurality of measurement markers, the optical axis 110$c$ of the reference camera 110 or the rotational axis 30$c$ of the movable member 40 is an example of the first rotational axis, and the rotational axis 30$c$ of the movable member 40 is an example of the second rotational axis.

As components in the claims, other various components having the structures or functions described in the claims can also be used.

What is claimed is:

1. A three-dimensional coordinate measuring device for measuring coordinates of a measurement point, the three-dimensional coordinate measuring device comprising:
   a reference base;
   a motorized rotation stage rotatably supported with respect to the reference base, the motorized rotation stage being rotatable about a first rotational axis;
   a plurality of reference markers provided on the motorized rotation stage;
   a reference camera fixed to the reference base, the reference camera capturing an image of the plurality of reference markers;
   a memory that stores information about arrangement of the plurality of reference markers as reference marker information and stores an imaging parameter of the reference camera;
   a coordinate calculation unit that calculates position/posture information indicating a position and a posture of the motorized rotation stage with respect to the reference camera based on the image of the plurality of reference markers captured by the reference camera and the reference marker information and the imaging parameter stored in the memory, and calculates coordinates of a measurement point based on the position/posture information; and
   a calibration updating unit that calculates a new imaging parameter based on a plurality of reference images each including the image of the plurality of reference markers captured by the reference camera and the reference marker information stored in the memory, each of the plurality of reference images captured at respective different postures of the motorized rotation stage by rotating the motorized rotation stage about the first rotational axis, and updates the imaging parameter stored in the memory to the new imaging parameter.

2. The three-dimensional coordinate measuring device according to claim 1, further comprising:
   a calibration deciding unit that calculates first positions, on a light receiving surface of the reference camera, of projected images of the plurality of reference markers based on the reference marker information and the imaging parameter stored in the memory, detects actual positions, on the light receiving surface, of the projected images of the plurality of reference markers based on the plurality of reference images captured at respective different postures of the motorized rotation stage, performs a decision associated with a calibration of the reference camera based on a relationship between the first positions of the projected images and the actual positions of the projected images and a predetermined criteria, and outputs a result of the decision.

3. The three-dimensional coordinate measuring device according to claim 2, further comprising:
  a presentation unit that presents, to a user, the result of the decision output from the calibration deciding unit.

4. The three-dimensional coordinate measuring device according to claim 1, further comprising:
  a probe that has a plurality of measurement markers and designates the measurement point on the measurement target; and
  a movable camera fixed to the motorized rotation stage, configured to capture an image of the plurality of measurement markers of the probe;
  wherein the coordinate calculation unit calculates the coordinates of the measurement point designated by the probe based on the position/posture information and measurement point information indicating the image of the plurality of measurement markers captured by the movable camera.

5. The three-dimensional coordinate measuring device according to claim 1,
  wherein the first rotational axis extends vertically or horizontally.

6. The three-dimensional coordinate measuring device according to claim 1,
  wherein the motorized rotation stage is also rotatable about a second rotational axis,
  the first rotational axis extends vertically, and
  the second rotational axis extends horizontally.

7. The three-dimensional coordinate measuring device according to claim 1,
  wherein the motorized rotation stage is movable within a predetermined plane.

8. The three-dimensional coordinate measuring device according to claim 1,
  a measurement point information acquisition unit that acquires, as measurement point information, information about a position of the measurement point on the measurement target,
  wherein the measurement target is placeable on the motorized rotation stage, and
  the coordinate calculation unit calculates the coordinates of the measurement point based on the position/posture information and the measurement point information acquired by measurement point information acquisition unit.

9. A calibration method for a three-dimensional coordinate measuring device comprising a reference base;
  a motorized rotation stage rotatably supported with respect to the reference base, the motorized rotation stage being rotatable about a first rotational axis;
  a plurality of reference markers provided on the motorized rotation stage;
  a reference camera fixed to the reference base, the reference camera capturing an image of the plurality of reference markers, the calibration method comprising:
  storing information about arrangement of the plurality of reference markers as reference marker information;
  storing an imaging parameter of the reference camera;
  calculating position/posture information indicating a position and a posture of the motorized rotation stage with respect to the reference camera based on the image of the plurality of reference markers captured by the reference camera and the reference marker information and the imaging parameter;
  calculating coordinates of a measurement point based on the position/posture information;
  rotating the motorized rotation stage about the first rotational axis to change postures of the motorized rotation stage;
  capturing each of a plurality of reference images by the reference camera at respective different postures of the motorized rotation stage;
  calculating a new imaging parameter based on the plurality of reference images each including the image of the plurality of reference markers captured by the reference camera and the reference marker information;
  updating the imaging parameter to the new imaging parameter.

10. A method for notifying associated with calibration for a three-dimensional coordinate measuring device comprising a reference base;
  a motorized rotation stage rotatably supported with respect to the reference base, the motorized rotation stage being rotatable about a first rotational axis;
  a plurality of reference markers provided on the motorized rotation stage;
  a reference camera fixed to the reference base, the reference camera capturing an image of the plurality of reference markers, the method comprising:
  storing information about arrangement of the plurality of reference markers as reference marker information;
  storing an imaging parameter of the reference camera;
  calculating position/posture information indicating a position and a posture of the motorized rotation stage with respect to the reference camera based on the image of the plurality of reference markers captured by the reference camera and the reference marker information and the imaging parameter;
  calculating coordinates of a measurement point based on the position/posture information;
  rotating the motorized rotation stage about the first rotational axis to change postures of the motorized rotation stage;
  calculating first positions, on a light receiving surface of the reference camera, of projected images of the plurality of reference markers based on the reference marker information and the imaging parameter;
  detecting actual positions, on the light receiving surface, of the projected images of the plurality of reference markers based on the plurality of reference images captured by the reference camera at respective different postures of the motorized rotation stage;
  performing a decision associated with a calibration of the reference camera based on a relationship between the first positions of the projected images and the actual positions of the projected images and a predetermined criteria; and
  outputting a result of the decision.

* * * * *